(12) United States Patent
Moriya et al.

(10) Patent No.: US 6,403,708 B2
(45) Date of Patent: Jun. 11, 2002

(54) CRYSTALLINE POLYPROPYLENES, PROCESS FOR PREPARING THEREOF, POLYPROPYLENE COMPOSITIONS, AND THERMOFORMED PRODUCTS

(75) Inventors: Satoru Moriya; Shinya Matsunaga; Shinichi Kojoh; Kenji Sugimura; Masahiro Kishine; Norio Kaneshige; Mamoru Kioka; Teruhisa Kojima, all of Yamaguchi (JP)

(73) Assignee: Mitsui Chemicals INC, Tokyo (JP)

( * ) Notice: Subject to any disclaimer, the term of this patent is extended or adjusted under 35 U.S.C. 154(b) by 0 days.

(21) Appl. No.: 09/194,363

(22) PCT Filed: May 27, 1997

(86) PCT No.: PCT/JP97/01790

§ 371 (c)(1),
(2), (4) Date: Nov. 25, 1998

(87) PCT Pub. No.: WO97/45463

PCT Pub. Date: Dec. 4, 1997

(30) Foreign Application Priority Data

May 27, 1996 (JP) .............................................. 8-131741

(51) Int. Cl.$^7$ .......................... C08F 10/06; C08L 23/10
(52) U.S. Cl. .............................. 525/88; 526/86; 526/87
(58) Field of Search ...................... 526/86, 87; 525/88, 525/89

(56) References Cited

U.S. PATENT DOCUMENTS 5,844,046 A * 12/1998 Ohgizawa et al. .......... 525/270

FOREIGN PATENT DOCUMENTS

| EP | 0564004 | | 10/1993 |
|---|---|---|---|
| EP | 0573862 | * | 12/1993 |
| EP | 0641807 | | 3/1995 |
| EP | 0657477 | | 6/1995 |
| EP | 0712869 | | 5/1996 |
| JP | 5-239149 | * | 9/1993 |

* cited by examiner

Primary Examiner—Jeffrey Mullis
(74) Attorney, Agent, or Firm—Sherman & Shalloway

(57) ABSTRACT

Crystalline polypropylene contains components insoluble in 64° C. decane satisfying the characteristics involving intrinsic viscosity; Mz/Mn; pentadvisotacticity, D value and Mw/Mn, are excellent in hardness and rigidity, high in melt tension, and excellent in molding properties. Processes for preparing such crystalline polypropylenes, and polypropylene compositions and thermoformed products that contain such crystalline polypropylenes are also described. The number-average molecular weight Mn of the components insoluble in 64° C. decane is preferably 25000 or more.

26 Claims, No Drawings

CRYSTALLINE POLYPROPYLENES, PROCESS FOR PREPARING THEREOF, POLYPROPYLENE COMPOSITIONS, AND THERMOFORMED PRODUCTS

CROSS-REFERENCE TO RELATED APPLICATIONS

This application is the Section 371 entry into the United States from International Application, PCT/JP97/01790, filed May 27, 1997.

FIELD OF THE ART

The present invention concerns crystalline polypropylenes, that are especially excellent in hardness and rigidity, high in melt tension, and have excellent molding properties, process for preparing such polypropylenes, and compositions and thermoformed products obtained from such polypropylenes.

BACKGROUND ART

Crystalline polypropylenes are excellent in hardness, rigidity, heat resistance, surface gloss (luster), etc., and have been conventionally used in various applications. In particular, crystalline polypropylenes are used in automobile bumpers, etc., that require high rigidity.

Such crystalline polypropylenes are used upon blending various modifiers according to the application, and are generally blended with an impact resistance modifier, such as polyethylene, rubber material, etc.

Previously, in order to compensate for the lowering of rigidity that accompanies the addition of the impact resistance modifier, an inorganic filler, such as talc, has been added.

However, there is a limit to the rigidity improvement effect that can be provided by the addition of an inorganic filler, and for example in systems using a large amount of impact resistance modifiers, it was difficult to obtain a polypropylene resin composition of adequately high rigidity even upon addition of an inorganic filler.

Polypropylene resins that are even more improved in rigidity were thus desired especially in thermoformed product applications requiring hardness and high rigidity.

It is known that the rigidity of polypropylene can be improved by raising its crystallinity (stereoregularity), and it is also considered that the rigidity of polypropylene is so desired that the wider molecular weight distribution (Mw/Mn) of the crystalline components (components insoluble in 64° C. decane) contained in the polypropylene is obtained.

The present inventors also carried out research toward improvement of the rigidity of polypropylene, and found that even if a crystalline polypropylene contains components insoluble in 64° C. decane of a wide molecular weight distribution (Mw/Mn), the polypropylene cannot always be sufficiently satisfactory in rigidity, elongation, and toughness if the polypropylene has a wide molecular weight distribution in both the high molecular weight side and low molecular weight side. The present inventor then found that crystalline polypropylenes and polypropylene compositions containing crystalline components (components insoluble in 64° C. decane), which not only have a wide molecular weight distribution (Mw/Mn) but also have a wide molecular weight distribution (Mz/Mw), as determined from the z-average molecular weight and weight-average molecular weight of said components insoluble in decane, of 5 or more, and which have a pentad isotacticity of 98% or more, and for which the frequency dependence value D of the viscoelastic loss tangent under constant strain is 4.0 or more, are extremely excellent in rigidity, and has thereby been led to complete the present invention.

Polypropylenes of wide molecular weight distribution have been proposed previously, and for example in Japanese laid-open patent publication No. 59-172507 is disclosed the production of a polypropylene (PP) by two-stage polymerization to produce a high molecular weight component (35 to 65 wt. % of polypropylene of ($\eta$)=1.8 to 10 dl/g in the first stage) and a low molecular weight component (65 to 35 wt. % of polypropylene of ($\eta$)=0.6 to 1.2dl/g in the second stage), and then finally to produce polypropylene of ($\eta$)=1.2 to 7 dl/g and Mw/Mn of 6 to 20. Also, in Japanese laid-open patent publication No. 4-370103 is disclosed the production of a high molecular weight component having MFR=0.0001 to 10 g/10 minutes in the stage of producing the component of highest molecular weight in multiple-stage polymerization and a low molecular weight component of MFR=10 to 100 g/10 minutes in the stage producing the low molecular weight component. In Japanese laid-open patent publication No. 8-3223 are disclosed polypropylenes having Mw=1.2 to 2 million, Mw/Mn of 30 to 70, and containing 7 to 15 wt. % of a high molecular weight component of Mw$\geq$5 million and 20 to 50 wt. % of a low molecular weight component of Mw<100 thousand.

However the polypropylenes that are disclosed in these patent publications all have a wide distribution both in the high molecular weight side and low molecular weight side and such polypropylenes cannot always be sufficiently satisfactory in rigidity, elongation, and toughness as mentioned above.

In Japanese laid-open patent publication No. 4-202507 is disclosed a process of producing PP by polymerizing a PP component (0.1 to 35 wt. %) of ($\eta$)=5 to 40 dl/g using a prepolymerized catalyst and then polymerizing the remaining PP components in another polymerizer to obtain PP having MFR=0.1 to 2000 g/10 minutes. In Japanese patent publication No. 7-5668 is disclosed highly crystalline polypropylenes having an MFR of 0.1 to 200 g/10 minutes with which the MFR value and the ratio of absorbance at 997cm$^{-1}$ and 973 cm$^{-1}$ (997 cm$^{-1}$/973 cm$^{-1}$) in the IR spectrum satisfy specific relationships, said IR absorbance ratio of the initial precipitate component, that comprises 2 to 3 wt. % of the total amount dissolved when the polypropylene is dissolved in xylene, is 0.97 or more, and the Mw of said precipitate component/Mw of total PP is 3 or more.

Although the above patent publications disclose polypropylenes that contain high molecular weight components, none of the publications disclose the widening of the molecular weight distribution at the high molecular weight side without widening the molecular weight distribution at the low molecular weight side.

DISCLOSURE OF THE INVENTION

The crystalline polypropylenes of the present invention are characterized in containing components insoluble in 64° C. decane that satisfy the following characteristics (1) to (4):

(1) The intrinsic viscosity ($\eta$) (in 135° C. decalin) is 0.5 to 10 dl/g;

(2) the molecular weight distribution (Mz/Mw) as determined by gel permeation chromatography (GPC; solvent: o-chlorobenzene, measurement temperature: 140° C.) is 5 or more;

(3) the pentad isotacticity (mmmm percentage), which is a stereoregularity index determined by the measurement of the $^{13}$C-NMR spectrum, is 98% or more; and (4) the D value, determined using formula (1) below from the loss tangents, tan $\delta_{0.05}$ and tan $\delta_{10}$ measured at the frequencies, 0.05 rad/sec and 10 rad/sec, respectively, by a melt viscoelasticity measuring device under a temperature of 230° C. and constant strain, and said loss tangent measurement frequencies, is 4.0 or more.

$$D = \left| \frac{\log(0.05) - \log(10)}{\log(\tan\delta_{0.05}) - \log(\tan\delta_{10})} \right| \quad (1)$$

It is preferable for the number-average molecular weight Mn of the components insoluble in 64° C. decane to be 25000 or more.

It is preferable for the crystalline polypropylene of the present invention to contain 60 wt. % (% by weight) or more of the above-described components insoluble in 64° C. decane.

It is preferable for the crystalline polymer to contain a prepolymer as a nucleating agent.

The abovementioned polypropylene may specifically be a homopolypropylene or a propylene block copolymer.

The crystalline polypropylene can be produced by multiple-stage polymerization of propylene, optionally, along with another monomer in the presence of a catalyst for preparing highly stereoregular polypropylene.

In the present invention, it is preferable to perform the abovementioned multiple-stage polymerization in three stages, wherein in the first stage crystalline polypropylene having an intrinsic viscosity ($\eta$) of 8 to 20 dl/g is produced at an amount corresponding to 0.5 to 15 wt. % of the finally obtained crystalline polypropylene, in the second stage crystalline polypropylene having an intrinsic viscosity ($\eta$) of 3 to 10 dl/g is produced at an amount corresponding to 0.5 to 30 wt. % of the finally obtained crystalline polypropylene, and in the third stage crystalline polypropylene having an intrinsic viscosity ($\eta$) of 0.8 to 4.0 dl/g is produced at an amount corresponding to 99 to 55 wt. % of the finally obtained crystalline polypropylene.

The multiple-stage polymerization may also be carried in two stages, wherein in the first stage crystalline polypropylene having an intrinsic viscosity ($\eta$) of 8 to 20 dl/g is produced at an amount corresponding to 0.5 to 15 wt. % of the finally obtained crystalline polypropylene and in the second stage crystalline polypropylene having an intrinsic viscosity ($\eta$) of 0.8 to 4.0 dl/g is produced at an amount corresponding to 99.5 to 85 wt. % of the finally obtained crystalline polypropylene.

In the present invention, the crystalline polypropylene may be obtained by blending two or more types of crystalline polypropylene that differ in intrinsic viscosity ($\eta$), and may be obtained for example by blending 0.5 to 15 wt. % of crystalline polypropylene having an intrinsic viscosity ($\eta$) of 8 to 20 dl/g with 99.5 to 85 wt. % of crystalline polypropylene having an intrinsic viscosity ($\eta$) of 0.8 to 4.0 dl/g.

The polypropylene composition of the present invention comprises components soluble in 140° C. decane and, optionally, components insoluble in 140° C. decane, in which the components soluble in 140° C. decane that are also components insoluble in 64° C. decane are crystalline polypropylenes that satisfy the characteristics (1) to (4) given above.

This polypropylene composition preferably contains 70 wt. % or more of the components soluble in 140° C. decane and it is preferable that the components insoluble in 64° C. decane are included in an amount of 60 wt. % or more of the components soluble in 140° C. decane.

It is preferable that the polypropylene composition of the present invention contains a nucleating agent.

It is also preferable with the polypropylene composition of the present invention that the components soluble in 140° C. decane that are also components soluble in 64° C. decane comprise an ethylene/$\alpha$-olefin copolymer or a styrene copolymer, and that the components insoluble in 140° C. decane comprise an inorganic filler selected from among talc, glass fiber, potassium titanate, and barium sulfate.

The thermoformed product of the present invention is formed of the crystalline polypropylene or polypropylene composition described above.

BEST MODE FOR CARRYING OUT THE INVENTION

Crystalline polypropylenes (may also be referred to hereinafter simply as "polypropylenes") and polypropylene compositions containing such crystalline polypropylenes are described below. First, a description of the crystalline polypropylenes shall be given.

In the present invention, the term, "polymerization," may be used to refer not only to homopolymerization but also inclusively to copolymerization, and the term, "polymer," may be used to refer not only to a homopolymer but also inclusively to a copolymer.

Crystalline Polypropylene

The crystalline polypropylene of the present invention contains the below-described components insoluble in 64° C. decane at an amount of 60 wt. % or more, preferably 65 to 100 wt. %, and more preferably 70 to 100 wt. %.

These components insoluble in 64° C. decane are those which are considered to be the crystalline components in the polypropylene, and in the present specification, the components insoluble in 64° C. decane may also be referred to as "crystalline components."

The components insoluble in 64° C. decane of the crystalline polypropylene (polymer) are the components which precipitate at 64° C. after said polymer is dissolved in 140° C. decane.

Specifically, approximately 500 ml of decane and approximately 2 g of sample (polypropylene) are weighed accurately and introduced into a transparent flask set inside a glass, double-tube type constant temperature bath and then dissolved completely by stirring for approximately 1 hour at 140° C. Thereafter, the temperature of the solution is dropped gradually to 64° C. while stirring, and after the solution temperature has become constant at 64° C., stirring is continued a day and night and the precipitated components insoluble in decane are separated by filtration from a glass filter (or a metal net of 300 mesh, filter paper, etc., according to the circumstances).

The components insoluble in decane (powder-form) that have been obtained by filtration are then dissolved completely in approximately 500 ml of decane at approximately 140° C., then reprecipitated in excess acetone, and then separated by filtration. The decane- insoluble components that have thus been obtained are dried a day and night under reduced pressure in a vacuum drier set to approximately 80° C. and then weighed accurately.

The components soluble in 64° C. decane are obtained by pouring the filtrate obtained by the abovementioned hot filtration at 64° C. into 1 to 2 liter of methanol and then precipitating by adding 1 to 2 liter of acetone.

The components insoluble in 64° C. decane (crystalline component) obtained by decane separation of the crystalline polypropylene as described above satisfy all of the following characteristics (1) to (4): p0 (1) The intrinsic viscosity (η) (in 135° C. decalin) of the components insoluble in 64° C. decane is 0.5 to 10 dl/g, preferably 1.0 to 8.0 dl/g, and preferable still at 1.2 to 5.0 dl/g.

(2) The molecular weight distribution (Mz/Mw) of the components insoluble in 64° C. decane as determined by gel permeation chromatography (GPC; solvent: o-dichlorobenzene, measurement temperature: 140° C.) is 5 or more, preferably 5.5 to 30, and especially preferable 6.0 to 20.

In the GPC of the components insoluble in 64° C. decane, a greater Mz/Mw value of the molecular weight distribution (Mz/Mw), determined from the z-average molecular weight and the weight-average molecular weight, indicates that the distribution is wider at the high molecular weight side.

In the present invention, the Mz/Mw value of the components insoluble in 64° C. decane is 5 or more as described above and a large amount of the high molecular weight components is thus contained.

The molecular weight distribution (Mw/Mn) of the components insoluble in 64° C. decane is preferably 5.0 or more and especially preferable 6.0 to 20.

Also, the number-average molecular weight of the components insoluble in 64° C. decane should be 25000 or more, preferably 28000 or more, and preferably still at 30000 or more.

(3) Though the components insoluble in 64° C. decane of polypropylene generally is the crystalline component, the components insoluble in 64° C. decane of the crystalline polypropylene of the present invention are especially high in crystallinity, and the pentad isotacticity (mmmm percentage), which is a stereoregularity index, of the crystalline components is 98% or more, preferably 98.2 to 100%, and preferably still at 98.2 to 99.5%.

This pentad isotacticity is determined as the peak intensity ratio [Pmmmm]/[Pw] in the $^{13}$C-NMR spectrum of the components insoluble in 64° C. decane.

Here, [Pmmmm] is the peak intensity of the third methyl group in the isotactically bonded quintuple chain of the propylene unit and [Pw] is the methyl group peak intensity of the entire polypropylene unit.

(4) The crystalline polypropylene or the components insoluble in 64° C. decane of the polypropylene of the present invention exhibit the following specific viscoelastic property.

That is, the D value, determined using formula (1) below from the loss tangents, tan $\delta_{0.05}$ and tan $\delta_{10}$ measured at the frequencies, 0.05 rad/sec and 10 rad/sec respectively by a melt viscoelasticity measuring device under a temperature of 230° C. and constant strain, and said loss tangent measurement frequencies, is 4.0 or more, preferably 4.2 or more, preferably still at 4.5 or more, preferably still at even 5.0 to 30, and especially preferably 5.5 to 20.

$$D = \left| \frac{\log(0.05) - \log(10)}{\log(\tan\delta_{0.05}) - \log(\tan\delta_{10})} \right| \quad (1)$$

The abovementioned loss tangent (tan δ) value is specifically determined as follows.

That is, the components insoluble in 64° C. decane of the crystalline polypropylene are press molded at 230° C. and formed into a disk-shaped sheet of 2 mm thickness and 12.5 mm radius. Using this sheet, the loss elastic moduli, G' (MPa) and G" (MPa), at a frequency of 0.05 rad/sec and the loss elastic moduli, G' and G", at a frequency of 10 rad/sec are measured at 230° C. and under constant strain with a melt viscoelasticity measuring device to determine the loss tangent (tan δ=G"/G') values at the respective frequencies.

It is considered that with the crystalline components (components insoluble in 64° C. decane) of the crystalline polypropylene, the larger the frequency dependence value D of the viscoelastic loss tangent under constant strain, the greater the content of high molecular weight components.

The crystalline polypropylenes according to the invention that contain components insoluble in 64° C. decane that satisfy the above characteristics (1) to (4) are especially excellent in hardness and rigidity as well as high in melt tension and excellent in molding properties.

In particular, the crystalline polypropylenes of the present invention contain components insoluble in 64° C. decane (crystalline component) that have a wide molecular weight distribution (Mz/Mw), determined from the z-average molecular weight and weight-average molecular weight, of 5 or more, a pentad isotacticity of 98% or more, and a viscoelastic characteristic as specified by the D value of 4.0 or more, and a polypropylene that contains such crystalline components exhibits extremely high rigidity. Furthermore, excellent toughness is exhibited when the components insoluble in 64° C. decane have a number-average molecular weight Mn of 25000 or more.

Polypropylenes of the prior art, in evaluations of components insoluble in 64° C. decane having (η) value equivalent to that of the present invention, did not satisfy the characteristics of molecular weight distribution (Mz/Mw) of 5 or more, a viscoelastic characteristic as specified by the D value of 4 or more, and a pentad isotacticity of 98% or more at the same time.

Though it is preferable for the components insoluble in 64° C. decane (crystalline components) with the above-described characteristics to be usually comprised only of units derived from propylene, units that are derived from minute amounts of other monomers may also be contained according to necessity as long as the objects of the present invention are not spoiled.

Other monomers include for example, α-olefins other than propylene, such as ethylene, 1-butene, 1-pentene, 1-hexene, 4-methyl-1-pentene, 3-methyl-1-pentene, 1-heptene, 1-octene, 1-nonene, 1-decene, 1-dodecene, etc., vinyl compounds, such as styrene, vinylcyclopentene, vinylcyclohexane, vinylnorbornane, etc., vinyl esters, such as vinyl acetate, etc, unsaturated organic acids and derivatives thereof, such as maleic anhydride, etc., conjugated dienes, and non-conjugated polyenes, such as dicyclopentadiene, 1,4-hexadiene, dicyclooctadiene, methylene norbornene, 5-ethylidene-2-norbornene, etc. Among the above, ethylene and α-olefins of 4 to 10 carbon atoms are preferable. Also, two or more of the above may be copolymerized.

The crystalline polypropylene of the present invention is not specified in particular besides having components insoluble in 64° C. decane that satisfy the characteristics given above as the components insoluble in 64° C. decane, and the components soluble in 64° C. decane may be atactic polypropylene components or copolymerized rubber components such as those mentioned above. For example, olefin rubber components or conjugated diene rubber components, etc., may be contained as the components soluble in 64° C. decane.

The crystalline polypropylene may specifically be a homopolypropylene or a propylene block copolymer. In the present invention, even if a large amount of a rubber component, such as EPR (ethylene/propylene copolymer), is contained as the components soluble in 64° C. decane along with the abovementioned components insoluble in 64° C. decane, excellent rigidity is exhibited. It is preferable that such a polypropylene is a propylene block copolymer since it will then be excellent in impact resistance as well as rigidity, and a propylene block copolymer which has the intrinsic viscosity (η) of the rubber component is 0.5 to 10 dl/g is especially preferable.

It is also preferable for the crystalline polypropylene of the present invention to contain a homopolymer or copolymer of a branched olefin, such as 3-methyl-1-butene, 3,3-dimethyl-1-butene, 3-methyl-1-pentene, 3-ethyl-1-pentene, 4-methyl-1-pentene, 3-methyl-1-hexene, 4-methyl-1-hexene, 4,4-dimethyl-1-hexene, 4,4-dimethyl-1-pentene, 4-ethyl-1-hexene, 3-ethyl-1-hexene, 3,5,5-trimethyl-1-hexene, vinylcyclopentane, vinylcyclohexane, vinylcycloheptane, vinylnorbornane, allylnorbornane, styrene, dimethylstyrene, allylbenzene, allyltoluene, allylnapthalene, vinylnaphthalene, etc., as a prepolymer. Among the above, 3-methyl-1-butene, etc., are especially preferable.

Such a prepolymer derived from a branched olefin acts as a nucleating agent for crystallization.

The above described crystalline polypropylene of the present invention should have a melt flow rate (MFR: ASTM D1238-65T, 230° C., under load of 2.16 kg) of usually 0.1 to 200 g/10 minutes and preferably 0.5 to 100 g/10 minutes. The molding properties are satisfactory when the melt flow rate value is within such ranges.

Production of Crystalline Polypropylene

Although the process for preparing the crystalline polypropylene of the present invention is not specified in particular as long as the polypropylene can be produced so as to contain the above-described components insoluble in 64° C. decane, crystalline polypropylene can be formed for example by multiple-stage polymerization of propylene, in which a catalyst for preparing highly stereoregular polypropylene is used to perform the polymerization of the second stage onward in the presence of a polymer obtained in the first stage and upon changing the polymerization conditions.

With the present invention, it is preferable to use a catalyst for preparing highly stereoregular polypropylene in the production of polypropylene containing the above-described crystalline components, and for example, a catalyst, comprised of;
(a) a solid titanium catalyst component containing magnesium, titanium, halogen, and electron donor,
(b) an organometallic compound, and
(c) an organosilicon compound (c-1) of formula (i) below or a compound having two or more ether bonds between which are interposed a plurality of atoms, can be used.

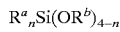
$$R^a{}_nSi(OR^b)_{4-n} \quad (i)$$

(In the above formula, n is 1, 2, or 3, at least one of the $R^a$'s is a secondary or tertiary hydrocarbon group, the $R^a$'s may be the same as or different from each other when n is 2 or 3, $R^b$ is a hydrocarbon group of 1 to 4 carbon atoms, and the $R^b$'s may be the same as or different from each other when 4−n is 2 or 3.)

The abovementioned solid titanium catalyst component (a) may be prepared by bringing a magnesium compound, titanium compound, and electron donor in contact with each other.

Magnesium compounds that have reducing ability and magnesium compounds that do not have reducing ability can be used as the magnesium compound to be used in the preparation of a titanium catalyst component.

Here, magnesium compounds having a magnesium-carbon bond or a magnesium-hydrogen bond may be given as examples of magnesium compounds that have reducing ability. Specific examples of such magnesium compounds that have reducing ability include dimethylmagnesium, diethylmagnesium, dipropylmagnesium, dibutylmagnesium, diamylmagnesium, dihexylmagnesium, didecylmagnesium, ethylmagnesium chloride, propylmagnesium chloride, butylmagnesium chloride, hexylmagnesium chloride, amylmagnesium chloride, butylethoxymagnesium, ethylbutylmagnesium, butylmagnesium hydride, etc.

Specific examples of magnesium compounds that do not have reducing ability include magnesium halides, such as magnesium chloride, magnesium bromide, magnesium iodide, magnesium fluoride, etc.; alkoxymagnesium halides, such as methoxymagnesium chloride, ethoxymagnesium chloride, isopropoxymagnesium chloride, butoxymagnesium chloride, octoxymagnesium chloride, etc.; aryloxymagnesium halides, such as phenoxymagnesium chloride, methylphenoxymagnesium chloride, etc.; alkoxymagnesiums, such as ethoxymagnesium, isopropoxymagnesium, butoxymagnesium, n-octoxymagnesium, 2-ethylhexoxymagnesium, etc.; aryloxymagnesiums, such as phenoxymagnesium, dimethylphenoxymagnesium, etc.; and carboxylates of magnesium, such as magnesium laurate, magnesium stearate, etc.

These magnesium compounds without reducing properties may be compounds derived from the abovementioned magnesium compounds with reducing properties or may be compounds derived in the process of preparing the catalyst component. To derive a magnesium compound that does not have reducing ability from a magnesium compound with reducing ability, the magnesium compound with reducing ability may be brought in contact with a polysiloxane compound, halogen-containing silane compound, halogen-containing aluminum compound, ester, alcohol, halogen-containing compound, ketone or other compound with an active carbon-oxygen bond.

The magnesium compound may also be derived from metal magnesium in the process of catalyst preparation.

Two or more magnesium compounds may be used in combination.

The abovementioned magnesium compound may form a complex compound or double compound with aluminum, zinc, boron, beryllium, sodium, potassium, or other metal or may be a mixture with another metal compound.

Although various magnesium compounds besides those mentioned above can be used in the present invention, it is preferable that the magnesium compound take the form of a halogen-containing magnesium compound in the solid titanium catalyst component (a) that is obtained in the final stage. Thus in the case where a magnesium compound that does not contain a halogen is used, it is preferable to subject the magnesium compound to a contact reaction with a halogen-containing compound in the process of preparing the catalyst component.

Among the above, magnesium compounds that do not have reducing ability are preferable, halogen-containing magnesium compounds are preferable still, and magnesium chloride, alkoxymagnesium chloride, and allyloxymagnesium chloride are especially preferable.

With the present invention, it is preferable that the magnesium compound is used in liquid form in the process of catalyst component preparation, and in the case where a magnesium compound among the abovementioned magnesium compounds is a solid, the magnesium compound can be made liquid in form by the use of an electron donor.

In the case where a magnesium compound among the abovementioned magnesium compounds is a solid, the magnesium compound can be made liquid in form by the use of an electron donor (liquifier).

For the liquifier, use can be made of an alcohol, phenol, ketone, aldehyde, ether, amine, or pyridine, etc., indicated below or tetraethoxytitanium, tetra-n-propoxytitanium, tetra-i-propoxytitanium, tetrabutoxytitanium, tetrahexoxytitanium, tetrabutyoxyzirconium, tetraethoxyzirconium, or other metal acid ester, etc., as an electron donor.

Among the above, use of an alcohol or metal acid ester is especially favorable.

The reaction of liquefying the solid magnesium compound is generally carried out by a method in which the solid magnesium compound is brought in contact with an abovementioned liquifier and heating as necessary. This contact is normally carried out at a temperature of 0 to 200° C., preferably 20 to 180° C., and preferably still at 50 to 150° C.

Also a hydrocarbon solvent, etc., may be made to coexist in the liquefying reaction, and for example, an aliphatic hydrocarbon, such as pentane, hexane, heptane, octane, decane, dodecane, tetradecane, kerosene, etc.; an alicyclic hydrocarbon, such as cyclopentane methylcyclopentane, cyclohexane, methylcyclohexane, cyclooctane, cyclohexene, etc.; a halogenated hydrocarbon, such as dichloroethane, dichloropropane, trichloroethylene, chlorobenzene, etc.; or an aromatic hydrocarbon, such as benzene, toluene, xylene, etc., may be used.

In the preparation of the solid titanium catalyst component (a), it is preferable to use a quadrivalent titanium compound of the following formula as the titanium compound.

$$Ti(OR)_gX_{4-g}$$

(In the above formula, R indicates a hydrocarbon group, X indicates a halogen atom, and g satisfies $0 \leq g \leq 4$.)

Specific examples of such a titanium compound include tetrahalogenated titaniums, such as $TiCl_4$, $TiBr_4$, $TiI_4$, etc.;

trihalogenated alkoxytitaniums, such as $Ti(OCH_3)Cl_3$, $Ti(OC_2H_5)Cl_3$, $Ti(O-n-C_4H_9)Cl_3$, $Ti(OC_2H_5)Br_3$, $Ti(O-iso-C_4H_9)Br_3$, etc.;

dihalogenated dialkoxytitaniums, such as $Ti(OCH_3)_2Cl_2$, $Ti(OC_2H_5)_2Cl_2$, $Ti(O-n-C_4H_9)_2Cl_2$, $Ti(OC_2H_5)_2Br_2$, etc.;

monohalogenated trialkoxytitaniums, such as $Ti(OCH_3)_3Cl$, $Ti(OC_2H_5)_3Cl$, $Ti(O-n-C_4H_9)_3Cl$, $Ti(OC_2H_5)_3Br$, etc.; and tetralkoxytitaniums, such as $Ti(OCH_3)_4$, $Ti(OC_2H_5)_4$, $Ti(O-n-C_4H_9)_4$, $Ti(O-iso-C_4H_9)_4$, $Ti(O-2-ethylhexyl)_4$, etc.

Among the above, halogen-containing titanium compounds are preferable, tetrahalogenated titaniums are also preferable, and titanium tetrachloride is particularly preferable. Two or more of the above titanium compounds may be used as combinations. Also, the titanium compound may be used upon dilution in a hydrocarbon compound or halogenated hydrocarbon compound, etc.

Examples of the electron donor used in the preparation of the solid titanium catalyst component (a) include alcohols, phenols, ketones, aldehydes, esters of organic and inorganic acids, organic acid halides, ethers, acid amides, acid anhydrides, ammonia, amines, nitriles, isocyanates, nitrogen-containing cyclic compounds, oxygen-containing cyclic compounds.

More specific examples include alcohols of 1 to 18 carbon atoms, such as methanol, ethanol, propanol, pentanol, hexanol, octanol, 2-ethylhexanol, dodecanol, octadecyl alcohol, oleyl alcohol, benzyl alcohol, phenylethyl alcohol, cumyl alcohol, isopropyl alcohol, isopropylbenzyl alcohol, etc.;

phenols of 6 to 20 carbon atoms, which may contain a lower alkyl group, such as phenol, cresol, xylenol, ethyl phenol, propyl phenol, nonyl phenol, cumyl phenol, naphthol, etc.;

ketones of 3 to 15 carbon atoms, such as acetone, methyl ethyl ketone, methyl isobutyl ketone, acetophenone, benzophenone, acetylacetone, benzoquinone, etc.;

aldehydes of 2 to 15 carbon atoms, such as acetaldehyde, propionaldehyde, octylaldehyde, benzaldehyde, tolaldehyde, naphthaldehyde, etc.;

organic acid esters of 2 to 30 carbon atoms, such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexenecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, n-butyl maleate, diisobutyl methylmalonate, di-n-hexyl cyclohexenecarboxylate, diethyl nadicate, diisopropyl tetrahydrophthalate, diethyl phthalate, diisobutyl phthalate, di-n-butyl phthalate, di-2-ethylhexyl phthalate, γ-butyrolactone, δ-valerolactone, cumarin, phthalide, ethyl carbonate, etc.;

acid halides of 2 to 15 carbon atoms, such as acetyl chloride, benzoyl chloride, toluyl chloride, anisyl chloride, etc.;

ethers of 2 to 20 carbon atoms, such as methyl ether, ethyl ether, isopropyl ether, butyl ether, amyl ether, anisole, diphenyl ether epoxy-p-methane, etc.;

acid amides, such as acetic acid amide, benzoic acid amide, toluic acid amide, etc.;

acid anhydrides, such as acetic anhydride, phthalic anhydride, benzoic anhydride, etc.;

amines, such as methylamine, ethylamine, dimethylamine, diethylamine, ethylenediamine, tetramethylenediamine, hexamethylenediamine, tributylamine, tribenzylamine, etc.;

nitriles, such as acetonitrile, benzonitrile, trinitrile, etc.;

nitrogen-containing ring compounds including pyrroles, such as pyrrole, methylpyrrole, dimethylpyrrole, etc.; pyrroline; pyrrolidine; indole; pyridines, such as pyridine, methylpyridine, ethylpyridine, propylpyridine, dimethylpyridine, ethylmethylpyridine, trimethylpyridine, phenylpyridine, benzylpyridine, pyridine chloride, etc.; piperidines; quinolines; isoquinolines; etc.; and oxygen-containing ring compounds, such as tetrahydrofuran, 1,4-cineole, 1,8-cineole, pinolfuran, methylfuran, dimethylfuran, diphenylfuran, benzofuran, cumaran, phthalan, tetrahydropyran, pyran, dihydropyran, etc.

Multivalent carboxylates having the skeletons expressed by the general formulae below can be given as particularly preferable examples of organic acid esters.

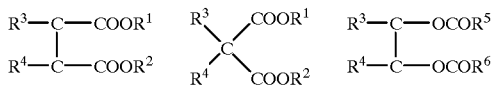

In the above formulae, $R^1$ indicates a substituted or non-substituted hydrocarbon group. $R^2$, $R^5$, and $R^6$ indicates hydrogen or substituted or non-substituted hydrocarbon groups. $R^3$ and $R^4$ indicates hydrogen or substituted or non-substituted hydrocarbon groups and, preferably at least, one of either a substituted or non-substituted hydrocarbon group. $R^3$ and $R^4$ may be joined together to form a cyclic structure. In the case where a hydrocarbon group among $R^1$ to $R^6$ is substituted, the substituent contains a heteroatom, such as N, O, S, and has a group such as C—O—C, COOR, COOH, OH, $SO_3H$, —C—N—C, $NH_2$, etc.

Specific examples of such a multivalent carboxylate include:

aliphatic polycarboxylates, such as diethyl succinate, dibutyl succinate, diethyl methylsuccinate, diisobutyl a-methylglutarate, diethyl methylmalonate, diethyl ethylmalonate, diethyl isopropylmalonate, diethyl butylmalonate, diethyl phenylmalonate, diethyl diethylmalonate, diethyl dibutylmalonate, monooctyl maleate, dioctyl maleate, dibutyl maleate, dibutyl butylmaleate, diethyl butylmaleate, diisopropyl β-methylglutarate, diallyl ethylsuccinate, di-2-ethylhexyl fumarate, diethyl itaconate, dioctyl citraconate, etc.;

alicyclic polycarboxylates, such as diethyl 1,2-cyclohexanecarboxylate, diisobutyl 1,2-cyclohexanecarboxylate, diethyl tetrahydrophthalate, diethyl nadicate, etc.;

aromatic polycarboxylates, such as monoethyl phthalate, dimethyl phthalate, methylethyl phthalate, monoisobutyl phthalate, diethyl phthalate, ethylisobutyl phthalate, di-n-propyl phthalate, diisopropyl phthalate, di-n-butyl phthalate, diisobutyl phthalate, di-n-heptyl phthalate, di-2-ethylhexyl phthalate, di-n-octyl phthalate, dineopentyl phthalate, didecyl phthalate, benzylbutyl phthalate, diphenyl phthalate, diethyl naphthalenedicarboxylate, dibutyl naphthalenedicarboxylate, triethyl trimellitate, dibutyl trimellitate, etc.; and esters of heterocyclic polycarboxylic acids, such as 3,4-furandicarboxylic acid.

Other examples of multivalent carboxylates include esters of long-chain dicarboxylic acids, such as diethyl adipate, diisobutyl adipate, diisopropyl sebacate, di-n-butyl sebacate, di-n-octyl sebacate, di-2-ethylhexyl sebacate, etc.

Furthermore, with respect to the electron donor, the organosilicon compounds and polyether compounds mentioned below, water, and anion, cation, and non-ionic surfactants, etc., may be used as electron donor (c).

Among the above, it is preferable to use a carboxylate with the present invention, and it is especially preferable to use a multivalent carboxylate, in particular, a phthalate.

Two or more types of such electron donors may be used in combination.

In bringing an abovementioned titanium compound, magnesium compound, and electron donor in contact with each other, other reaction reagents of silicon, phosphorus, aluminum, etc., may coexist, and a carrier may be used to prepare a solid titanium catalyst component (a) that is carried on a carrier.

Examples of such a carrier include $Al_2O_3$, $SiO_2$, $B_2O_3$, MgO, CaO, $TiO_2$, ZnO, $SnO_2$, BaO, ThO, and resins, such as styrene-divinylbenzene copolymer, etc. Among these, $Al_2O_3$, $SiO_2$, and styrene-divinylbenzene copolymer can be used favorably.

Although the solid titanium catalyst component (a) can be prepared employing various methods including known methods, a few examples of the preparation method shall be described briefly below.

(1) A method in which a hydrocarbon solution of the magnesium compound containing the electron donor (liquifier) is subject to contact reaction with the organometallic compound, and the solid is subject to contact reaction with the titanium compound after being precipitated or while being precipitated.

(2) A method in which a complex comprised of the magnesium compound and the electron donor is subject to a contact reaction with an organometallic compound and then subject to a contact reaction with the titanium compound.

(3) A method in which the contact product of an inorganic carrier and the organic magnesium compound is contacted and reacted with the titanium compound and the electron donor. With this method, said contact product may be contacted and reacted with a halogen-containing compound and/or an organometallic compound.

(4) A method in which a carrier on which the magnesium compound is carried is obtained from a mixture of a magnesium compound solution, containing the liquifier and optionally a hydrocarbon solvent, the electron donor, and the carrier, and said carrier is thereafter brought in contact with the titanium compound.

(5) A method in which a solution containing the magnesium compound, titanium compound, electron donor and optionally a hydrocarbon solvent is brought in contact with a carrier.

(6) A method in which a liquid-form organic magnesium compound is contacted with a halogen-containing titanium compound. In this case, an electron donor is used at least once.

(7) A method in which after a liquid-form organic magnesium compound is contacted with a halogen-containing titanium compound, the product is contacted with the titanium compound. In this case, an electron donor is used at least once.

(8) A method in which an alkoxy group containing a magnesium compound is contacted with a halogen-containing titanium compound. In this case, an electron donor is used at least once.

(9) A method in which a complex comprised of an alkoxy group containing magnesium compound and the electron donor is contacted with the titanium compound.

(10) A method in which a complex comprised of an alkoxy group containing magnesium compound and the electron donor is contacted with an organometallic compound and then contacted and reacted with the titanium compound.

(11) A method in which the magnesium compound, electron donor, and titanium compound are contacted and reacted in an arbitrary order. Prior to the reaction, the respective components may be pretreated with the electron donor, a reaction assistant such as an organometallic compound or a halogen-containing silicon compound.

(12) A method in which a liquid-form magnesium compound without reducing ability is reacted under the presence of an electron donor with a liquid-form titanium compound to precipitate a solid magnesium-titanium complex.

(13) A method in which the reaction product obtained by (12) is furthermore reacted with the titanium compound.

(14) A method in which the reaction product obtained by (11) or (12) is furthermore reacted with the electron donor or the titanium compound.

(15) A method in which a solid product obtained by crushing the magnesium compound and the electron donor and the titanium compound is treated with a halogen, a halogen compound, or an aromatic hydrocarbon. This method may include a process in which just the magnesium compound, a complex comprised of the magnesium compound and the electron donor, or both of the magnesium compound and the titanium compound is/are crushed. Alternatively, pretreatment with a reaction assistant followed by treatment with a halogen, etc., may follow the crushing process. Organometallic compounds and halogen-containing silicon compounds may be used as the reaction assistant.

(16) A method in which the magnesium compound is crushed and then contacted with the titanium compound. The electron donor is used along with a reaction assistant according to necessity in the process of crushing and/or contacting the magnesium compound.

(17) A method in which the compound obtained by any of (11) to (16) above is treated with a halogen, a halogen compound, or an aromatic hydrocarbon.

(18) A method in which the contact reaction product of a metal oxide, organic magnesium, and a halogen-containing compound is contacted with the electron donor and preferably the titanium compound.

(19) A method in which a magnesium salt of an organic acid, a magnesium compound such as an alkoxymagnesium and an aryloxymagnesium is brought in contact with the titanium compound electron donor and, optionally, a halogen-containing hydrocarbon.

(20) A method in which a hydrocarbon solution containing the magnesium compound and an alkoxytitanium is brought in contact with the electron donor and, optionally, a titanium compound. In this process, it is preferable that a halogen-containing compound such as a halogen-containing silicon compound coexists.

(21) A method in which a solid magnesium-metal (aluminum) complex is precipitated by reacting a liquid-form magnesium compound without reducing ability with an organometallic compound and then reacting the complex with the electron donor and the titanium compound.

Although the usage amounts of the respective components used in the contact process differ according to the preparation method and cannot be specified in general, it is desirable to use, for example, 0.01 to 10 moles and preferably 0.1 to 5 moles of electron donor and 0.01 to 1000 moles and preferably 0.1 to 200 moles of titanium compound per mole of magnesium compound.

The solid titanium catalyst component (a) thus obtained contains magnesium, titanium, halogen, and electron donor, and in this solid titanium catalyst component (a), it is desirable for the halogen/titanium ratio (atomic ratio) to be approximately 2 to 200 and preferable at approximately 4 to 100, the electron donor/titanium ratio (molar ratio) to be approximately 0.01 to 100 and preferable at approximately 0.02 to 10, and the magnesium/titanium ratio (atomic ratio) to be approximately 1 to 100 and preferable at approximately 2 to 50.

In the present invention, an organometallic compound (b) is used as a catalyst along with the solid titanium catalyst component (a) described above. As this organometallic compound, a compound that contains a metal selected from among groups I to III of the periodic table is preferable. Specific examples include the following organic aluminum compounds, complex alkylates of a group I metal and aluminum, and organometallic compounds of a group II metal.

(b-1) Organic aluminum compounds of the general formula, $R^1_m Al(OR^2)_n H_p X_q$ (wherein $R^1$ and $R^2$ are hydrocarbon groups which may be the same as or different from each other, with each normally containing 1 to 15 and preferably 1 to 4 carbon atoms, X indicates a halogen atom, m is a number that satisfies $0<m\leqq3$, n is number that satisfies $0<n\leqq3$, p is a number that satisfies $0\leqq p<3$, q is a number that satisfies $0\leqq q<3$, and m+n+p+q=3).

(b-2) Complex alkylates, comprising a group I metal and aluminum and having the general formula, $M^1 AlR^1_4$ (wherein $M^1$ is Li, Na, or K and $R^1$ is the same as the above).

(b-3) Dialkylates, comprising a group II or group III metal and having the general formula, $R^1 R^2 M^2$ (wherein $R^1$ and $R^2$ are the same as the above and $M^2$ is Mg, Zn, or Cd).

Examples of organic aluminum compounds belonging to (b-1) described above include:
compounds of the formula, $$R^1_m Al(OR^2)_{3-m}$$

(wherein $R^1$ and $R^2$ are the same as the above and m is a number that preferably satisfies $1.5\leqq m\leqq 3$);
compounds of the formula, $$R^1_m AlX_{3-m}$$

(wherein $R^1$ is the same as the above, X is a halogen, and m preferably satisfies $0<m<3$);
compounds of the formula, $$R^1_m AlH_{3-m}$$

(wherein $R^1$ is the same as the above and m preferably satisfies $2<m\leqq 3$); and
compounds of the formula, $$R^1_m Al(OR^2)_n X_q$$

(wherein $R^1$ and $R^2$ are the same as the above, X is a halogen, $0<m\leqq 3$, $0\leqq n<3$, $0\leqq q<3$, and m+n+q=3).

Specific examples of aluminum compounds of (b-1) include trialkylaluminums, such as triethylaluminum, tributylaluminum, etc.; trialkenylaluminums, such as triisoprenylaluminum, etc.;
dialkylaluminum alkoxides, such as diethylaluminum ethoxide, dibutylaluminum butoxide, etc.;
alkylaluminum sequialkoxides, such as ethylaluminum sesquiethoxide, butylaluminum sesquibutoxide, etc.;
partially alkoxylated alkylaluminums with an average composition expressed by $R^1_{2.5}Al(OR^2)_{0.5}$, etc.;
dialkylaluminum halides, such as diethylaluminum chloride, dibutylaluminum chloride, diethylaluminum bromide, etc.;
partially halogenated alkylaluminums, including alkylaluminum sesquihalides, such as ethylaluminum sesquichloride, butylaluminum sequichloride, ethylaluminum sesquibromide, etc.; and alkylaluminum dihalides, such as ethylaluminum dichloride, propylaluminum dichloride, butylaluminum dibromide, etc.;
dialkylaluminum hydrides, such as diethylaluminum hydride, dibutylaluminum hydride, etc.;
alkylaluminum dihydrides, such as ethylaluminum dihydride, propylaluminum dihydride, etc., and other partially hydrogenated alkylaluminums; and partially alkoxylated and halogenated alkylaluminums, such as ethylaluminum ethoxychloride, butylaluminum butoxychloride, ethylaluminum ethoxybromide, etc.

Also, organic aluminum compounds in which two or more aluminum atoms are bonded via an oxygen atom or nitrogen atom can be given as compounds similar to (b-1). Examples of such compounds include
$(C_2H_5)_2AlOAl(C_2H_5)_2$, $(C_4H_9)_2AlOAl(C_4H_9)_2$, $(C_2H_5)_2AlN(C_2H_5)Al(C_2H_5)_2$, and aluminoxanes, such as methylaluminoxane.

Examples of the above-described compounds of (b-2) include $LiAl(C_2H_5)_4$, $LiAl(C_7H_{15})_4$, etc.

Among these, organic aluminum compounds, especially trialkylaluminums are favorable.

Two or more of organometallic compounds of (b) can be used in combination.

In addition to the above-described titanium catalyst component (a) and organometallic compound (b) used as catalysts, an organosilicon compound (c-1) or a compound having two or more ether bonds having a plurality of atoms interposed in between (c-2) is used as an electron donor in the present invention.

The organosilicon compounds (c-1) used in the present invention are of the following formula.

$$R^a_n Si(OR^b)_{4-n} \quad (i)$$

In the above formula, n is 1, 2, or 3, each of the $R^a$'s is a secondary or tertiary hydrocarbon group when n is 1, at least one of the $R^a$'s is a secondary or tertiary hydrocarbon group when n is 2 or 3, the $R^a$'s may be the same as or different from each other, each of the $R^b$'s is a hydrocarbon group of 1 to 4 carbon atoms, and the $R^b$'s may be the same as or different from each other when 4−n is 2 or 3.

Examples of the secondary or tertiary hydrocarbon group in the organosilicon compound (c-1) of formula (i) include cyclopentyl groups, cyclopentenyl groups, cyclopentadienyl groups, such groups with a substituent, and hydrocarbon groups in which the carbon adjacent the Si is a secondary or tertiary carbon.

Specific examples of substituted cyclopentyl groups include cyclopentyl groups with an alkyl group, such as the 2-methylcyclopentyl group, 3-methylcyclopentyl group, 2-ethylcyclopentyl group, 2-n-butylcyclopentyl group, 2,3-dimethylcyclopentyl group, 2,4-dimethylcyclopentyl group, 2,5-dimethylcyclopentyl group, 2,3-diethylcyclopentyl group, 2,3,4-trimethylcyclopentyl group, 2,3,5-trimethylcyclopentyl group, 2,3,4-triethylcyclopentyl group, tetramethylcyclopentyl group, tetraethylcyclopentyl group, etc.

Examples of substituted cyclopentenyl groups include cyclopentenyl groups with an alkyl group, such as the 2-methylcyclopentenyl group, 3-methylcyclopentenyl group, 2-ethylcyclopentenyl group, 2-n-butylcyclopentenyl group, 2,3-dimethylcyclopentenyl group, 2,4-dimethylcyclopentenyl group, 2,5-dimethylcyclopentenyl group, 2,3,4-trimethylcyclopentenyl group, 2,3,5-trimethylcyclopentenyl group, 2,3,4-triethylcyclopentenyl group, tetramethylcyclopentenyl group, tetraethylcyclopentenyl group, etc.

Examples of substituted cyclopentadienyl groups include cyclopentadienyl groups with an alkyl group, such as the 2-methylcyclopentadienyl group, 3-methylcyclopentadienyl group, 2-ethylcyclopentadienyl group, 2-n-butylcyclopentadienyl group, 2,3-dimethylcyclopentadienyl group, 2,4-dimethylcyclopentadienyl group, 2,5-dimethylcyclopentadienyl group, 2,3-diethylcyclopentadienyl group, 2,3,4-trimethylcyclopentadienyl group, 2,3,5-trimethylcyclopentadienyl group, 2,3,4-triethylcyclopentadienyl group, 2,3,4,5-tetramethylcyclopentadienyl group, 2,3,4,5-tetraethylcyclopentadienyl group, 1,2,3,4,5-pentamethylcyclopentadienyl group, 1,2,3,4,5-pentaethylcyclopentadienyl group, etc.

Examples of hydrocarbon groups in which the carbon adjacent Si is a secondary carbon include i-propyl group, s-butyl group, s-amyl group, α-methylbenzyl group, etc., and examples of hydrocarbon groups in which the carbon adjacent Si is a tertiary carbon include t-butyl group, t-amyl group, α,α'-dimethylbenzyl group, adamantyl group, etc.

Examples of organosilicon compounds (c-1) of formula (i) in which n is 1 include trialkoxysilanes, such as cyclopentyltrimethoxysilane, 2-methylcyclopentyltrimethoxysilane, 2,3-dimethylcyclopentyltrimethoxysilane, cyclopentyltriethoxysilane, iso-butyltriethoxysilane, t-butyltriethoxysilane, cyclohexyltrimethoxysilane, cyclohexyltriethoxysilane, 2-norbornanetrimethoxysilane, 2-norbornanetriethoxysilane, etc.

Examples in which n is 2 include dialkoxysilanes, such as dicyclopentyldiethoxysilane, t-butylmethyldimethoxysilane, t-butylmethyldiethoxysilane, t-amylmethyldiethoxysilane, dicyclohexyldimethoxysilane, cyclohexylmethyldimethoxysilane, cyclohexylmethyldiethoxysilane, 2-norbornanemethyldimethoxysilane, etc., and dimethoxy compounds of the following formula (ii)

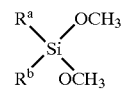

$$\begin{array}{c} R^a \\ \diagdown \\ \diagup \\ R^b \end{array} Si \begin{array}{c} OCH_3 \\ \diagup \\ \diagdown \\ OCH_3 \end{array} \quad (ii)$$

In the above formula, each of Ra and Rc is each independently a cyclopentyl group, substituted cyclopentyl group, cyclopentenyl group, substituted cyclopentenyl group, cyclopentadienyl group, substituted cyclopentadienyl group, or a hydrocarbon group in which the carbon adjacent the Si is a secondary or tertiary carbon.

Examples of such dimethoxy compounds of formula (ii) include
dicyclopentyldimethoxysilane,
dicyclopentenyldimethoxysilane,
dicyclopentadienyldimethoxysilane,
di-t-butyldimethoxysilane,
di(2-methylcyclopentyl)dimethoxysilane,
di(3-methylcyclopentyl)dimethoxysilane,
di(2-ethylcyclopentyl)dimethoxysilane,
di(2,3-dimethylcyclopentyl)dimethoxysilane,
di(2,4-dimethylcyclopentyl)dimethoxysilane,
di(2,5-dimethylcyclopentyl)dimethoxysilane,
di(2,3-diethylcyclopentyl)dimethoxysilane,
di(2,3,4-trimethylcyclopentyl)dimethoxysilane,
di(2,3,5-trimethylcyclopentyl)dimethoxysilane,
di(2,3,4-triethylcyclopentyl)dimethoxysilane,
di(tetramethylcyclopentyl)dimethoxysilane,
di(tetraethylcyclopentyl)dimethoxysilane,
di(2-methylcyclopentenyl)dimethoxysilane,
di(3-methylcyclopentenyl)dimethoxysilane,
di(2-ethylcyclopentenyl)dimethoxysilane, di(2-n-butylcyclopentenyl)dimethoxysilane,
di(2,3-dimethylcyclopentenyl)dimethoxysilane,
di(2,4-dimethylcyclopentenyl)dimethoxysilane,
di(2,5-dimethylcyclopentenyl)dimethoxysilane,
di(2,3,4-trimethylcyclopentenyl)dimethoxysilane,
di(2,3,5-trimethylcyclopentenyl)dimethoxysilane,
di(2,3,4-triethylcyclopentenyl)dimethoxysilane,
di(tetramethylcyclopentenyl)dimethoxysilane,
di(tetraethylcyclopentenyl)dimethoxysilane,
di(2-methylcyclopentadienyl)dimethoxysilane,
di(3-methylcyclopentadienyl)dimethoxysilane,
di(2-ethylcyclopentadienyl)dimethoxysilane,
di(2-n-butylcyclopentenyl)dimethoxysilane,
di(2,3-dimethylcyclopentadienyl)diethoxysilane,
di(2,4-dimethylcyclopentadienyl)dimethoxysilane,
di(2,5-dimethylcyclopentadienyl)dimethoxysilane,
di(2,3-diethylcyclopentadienyl)dimethoxysilane,
di(2,3,4-trimethylcyclopentadienyl)dimethoxysilane ,
di(2,3,5-trimethylcyclopentadienyl)dimethoxysilane,
di(2,3,4-triethylcyclopentadienyl)dimethoxysilane,
di(2,3,4,5-tetramethylcyclopentadienyl)dimethoxysilane,
di(2,3,4,5-tetraethylcyclopentadienyl)dimethoxysilane,
di(1,2,3,4,5-pentamethylcyclopentadienyl)dimethoxysilane,
di(1,2,3,4,5-pentaethylcyclopentadienyl)dimethoxysilane,
di-t-amyl-dimethoxysilane,
di (α,α'-dimethylbenzyl)dimethoxysilane,
di(adamantyl)dimethoxysilane,
adamantyl-t-butyldimethoxysilane,
cyclopentyl-t-butyldimethoxysilane,
diisopropyldimethoxysilane,
di-s-butyldimethoxysilane,
di-s-amyldimethoxysilane,
isopropyl-s-butyldimethoxysilane, etc.

Examples of compounds of formula (i) in which n is 3 include
monoalkoxysilanes, such as tricyclopentylmethoxysilane,
tricyclopentylethoxysilane,
dicyclopentylmethylmethoxysilane,
dicyclopentylethylmethoxysilane,
dicyclopentylmethylethoxysilane,
cyclopentyldimethylmethoxysilane,
cyclopentyldiethylmethoxysilane,
cyclopentyldimethylethoxysilane, etc.

Among the above, dimethoxysilanes, especially dimethoxysilanes of formula (ii) are preferable, and to be more specific, dicyclopentyldimethoxysilane, di-t-butyldimethoxysilane, di(2-methylcyclopentyl)dimethoxysilane, di(3-methylcyclopentyl)dimethoxysilane, and di-t-amyldimethoxysilane are preferable.

Two or more of the abovementioned organosilicon compounds (c-1) may be used in combination. In the compound used in the present invention having two or more ether bonds between which are interposed a plurality of atoms (shall also be referred to hereinafter as "polyether compound")(c-2), the atoms that exist between the ether bonds is one or more of atom selected from among carbon, silicon, oxygen, sulfur, phosphorus, and boron, and the number of such atoms is two or more. Preferably, a relatively bulky substituent, or to be more specific, a substituent of two or more carbon atoms, preferably three or more carbon atoms with a straight-chain, branched, or cyclic structure, preferably a branched or cyclic structure, is bonded to the atoms between the ether bonds. A compound is also preferable with which a plurality, preferably 3 to 20, preferably still 3 to 10, and preferably still more 3 to 7 carbon atoms are contained in the atoms that exist between the two or more ether bonds.

Compounds of the following formula can be given as examples of such a polyether compound.

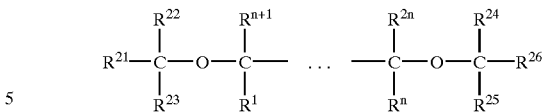

In the above formula, n is an integer that satisfies $2 \leq n \leq 10$, each of $R^1$ to $R^{26}$ is a substituent having at least one element selected from among carbon, hydrogen, oxygen, halogen, nitrogen, sulfur, phosphorus, boron, and silicon, and any of $R^1$ to $R^{26}$, preferably $R^1$ to $R^2n$ may jointly form a ring other than the benzene ring and may contain an atom other than a carbon atom in the main chain.

Specific examples of such polyether compounds include
2-(2-ethylhexyl)-1,3-dimethoxypropane,
2-isopropyl-1,3-dimethoxypropane,
2-butyl-1,3-dimethoxypropane,
2-s-butyl-1,3-dimethoxypropane,
2-cyclohexyl-1,3-dimethoxypropane,
2-phenyl-1,3-dimethoxypropane,
2-cumyl-1,3-dimethoxypropane,
2-(2-phenylethyl)-1,3-dimethoxypropane,
2-(2-cyclohexylethyl)-1,3-dimethoxypropane,
2-(p-chlorophenyl)-1,3-dimethoxypropane,
2-(diphenylmethyl)-1,3-dimethoxypropane,
2-(1-naphthyl)-1,3-dimethoxypropane,
2-(2-flurophenyl)-1,3-dimethoxypropane,
2-(1-decahydronaphthyl)-1,3-dimethoxypropane,
2-(p-t-butylphenyl)-1,3-dimethoxypropane,
2,2-dicyclohexyl-1,3-dimethoxypropane,
2,2-dicyclopentyl-1,3-dimethoxypropane,
2,2-diethyl-1,3-dimethoxypropane,
2,2-dipropyl-1,3-dimethoxypropane,
2,2-diisopropyl-1,3-dimethoxypropane,
2,2-dibutyl-1,3-dimethoxypropane,
2-methyl-2-propyl-1,3-dimethoxypropane,
2-methyl-2-benzyl-1,3-dimethoxypropane,
2-methyl-2-ethyl-1,3-dimethoxypropane,
2-methyl-2-isopropyl-1,3-dimethoxypropane,
2-methyl-2-phenyl-1,3-dimethoxypropane,
2-methyl-2-cyclohexyl-1,3-dimethoxypropane,
2,2-bis(p-chlorophenyl)-1,3-dimethoxypropane,
2,2-bis(2-cyclohexylethyl)-1,3-dimethoxypropane,
2-methyl-2-isobutyl-1,3-dimethoxypropane,
2-methyl-2-(2-ethylhexyl)-1,3-dimethoxypropane,
2,2-diisobutyl-1,3-dimethoxypropane,
2,2-diphenyl-1,3-dimethoxypropane,
2,2-dibenzyl-1,3-dimethoxypropane,
2,2-bis(cyclohexylmethyl)-1,3-dimethoxypropane,
2,2-diisobutyl-1,3-diethoxypropane,
2,2-diisobutyl-1,3-dibutoxypropane,
2-isobutyl-2-isopropyl-1,3-dimethoxypropane,
2-(1-methylbutyl)-2-isopropyl-1,3-dimethoxypropane,
2-(1-methylbutyl)-2-s-butyl-1,3-dimethoxypropane,
2,2-di-s-butyl-1,3-dimethoxypropane,
2,2-di-t-butyl-1,3-dimethoxypropane,
2,2-dineopentyl-1,3-dimethoxypropane,
2-isopropyl-2-isopentyl-1,3-dimethoxypropane,
2-phenyl-2-isopropyl-1,3-dimethoxypropane,
2-phenyl-2-s-butyl-1,3-dimethoxypropane,
2-benzyl-2-isopropyl-1,3-dimethoxypropane,
2-benzyl-2-s-butyl-1,3-dimethoxypropane,
2-phenyl-2-benzyl-1,3-dimethoxypropane,
2-cyclopentyl-2-isopropyl-1,3-dimethoxypropane,
2-cyclopentyl-2-s-butyl-1,3-dimethoxypropane,
2-cyclohexyl-2-isopropyl-1,3-dimethoxypropane,
2-cyclohexyl-2-s-butyl-1,3-dimethoxypropane, 2-isopropyl-2-s-butyl-1,3-dimethoxypropane
2-cyclohexyl-2-cyclohexylmethyl-1,3-dimethoxypropane,
2,3-diphenyl-1,4-diethoxybutane,
2,3-dicyclohexyl-1,4-diethoxybutane,
2,2-dibenzyl-1,4-diethoxybutane,
2,3-dicyclohexyl-1,4-diethoxybutane,
2,3-diisopropyl-1,4-diethoxybutane,
2,2-bis(p-methylphenyl)-1,4-dimethoxybutane,
2,3-bis(p-chlorophenyl)-1,4-dimethoxybutane,
2,3-bis(p-fluorophenyl)-1,4-dimethoxybutane,
2,4-diphenyl-1,5-dimethoxypentane,
2,5-diphenyl-1,5-dimethoxyhexane,
2,4-diisopropyl-1,5-dimethoxypentane,
2,4-diisobutyl-1,5-dimethoxypentane,
2,4-diisoamyl-1,5-dimethoxypentane,
3-methoxymethyltetrahydrofuran,
3-methoxymethyldioxane,
1,3-diisobutoxypropane,
1,2-diisobutoxypropane,
1,2-diisobutoxyethane,
1,3-diisoamyloxypropane,
1,3-diisoneopentyloxyethane,
1,3-dineopentyloxypropane,
2,2-tetramethylene-1,3-dimethoxypropane,
2,2-pentamethylene-1,3-dimethoxypropane,
2,2-hexamethylene-1,3-dimethoxypropane,
1,2-bis(methoxymethyl)cyclohexane,
2,8-dioxaspiro[5,5]undecane,
3,7-dioxabicyclo[3,3,1]nonane,
3,7-dioxabicyclo[3,3,0]octane,
3,3-diisobutyl-1,5-oxononane,
6,6-diisobutyldioxyheptane,
1,1-dimethoxymethylcyclopentane,
1,1-bis(dimethoxymethyl)cyclohexane,
1,1-bis(methoxymethyl)bicyclo[2,2,1]heptane,
1,1-dimethoxymethylcyclopentane,
2-methyl-2-methoxymethyl-1,3-dimethoxypropane,
2-cyclohexyl-2-ethoxymethyl-1,3-diethoxypropane,
2-cyclohexyl-2-methoxymethyl-1,3-dimethoxypropane,
2,2-diisobutyl-1,3-dimethoxycyclohexane,
2-isopropyl-2-isoamyl-1,3-dimethoxycyclohexane,
2-cyclohexyl-2-methoxymethyl-1,3-dimethoxycyclohexane,
2-isopropyl-2-methoxymethyl-1,3-dimethoxycyclohexane,
2-isobutyl-2-methoxymethyl-1,3-dimethoxycyclohexane,
2-cyclohexyl-2-ethoxymethyl-1,3-diethoxycyclohexane,
2-cyclohexyl-2-ethoxymethyl-1,3-dimethoxycyclohexane,
2-isopropyl-2-ethoxymethyl-1,3-diethoxycyclohexane,
2-isopropyl-2-ethoxymethyl-1,3-dimethoxycyclohexane,
2-isobutyl-2-ethoxymethyl-1,3-diethoxycyclohexane,
2-isobutyl-2-ethoxymethyl-1,3-dimethoxycyclohexane,
tris(p-methoxyphenyl)phosphine,
methylphenyl-bis(methoxymethyl)silane,
diphenyl-bis(methoxymethyl)silane
methylcyclohexyl-bis(methoxymethyl)silane,
di-t-butyl-bis(methoxymethyl)silane,
cyclohexyl-t-butyl-bis(methoxymethyl)silane,
i-propyl-t-butyl-bis(methoxymethyl)silane, etc.

Among the above, 1,3-diethers are used preferably, and 2,2-diisobutyl-1,3-dimethoxypropane, 2-isopropyl-2-isopentyl-1,3-dimethoxypropane, 2,2-dicyclohexyl-1,3-dimethoxypropane, and 2,2-bis(cyclohexylmethyl)-1,3-dimethoxypropane are used especially preferably.

Two or more of the above polyether compounds (c-2) may be used in combination.

In the present invention, an organosilicon compound (c-1) and a polyether compound (c-2) mentioned above can be used in combination as the electron donor (c).

Furthermore, organosilicon compounds of the following formula may also be used in combination.

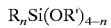

$R_nSi(OR')_{4-n}$ (In the above formula, R and R' are hydrocarbon groups, 0<n<4, and organosilicon compounds indicated by this formula do not include organosilicon compounds (c-1) of formula (i) given above.)

Specific examples include trimethylmethoxysilane, trimethylethoxysilane, dimethyldimethoxysilane, dimethyldiethoxysilane, diisopropyldimethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bis-ethylphenyldimethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, chloropropyltrimethoxysilane, methyltriethoxysilane, ethyltriethoxysilane, vinyltriethoxysilane, n-butyltriethoxysilane, phenyltriethoxysilane, γ-aminopropyltriethoxysilane, chlorotriethoxysilane, ethyltriisopropoxysilane, vinyltributoxysilane, trimethylphenoxysilane, methyltriallyloxysilane, vinyl-tris (β-methoxyethoxysilane), vinyltriacetoxysilane, etc.

Ethyl silicate, butyl silicate, dimethyltetraethoxydisiloxane, etc., may also be used.

In the present invention, prepolymerization can be performed in advance in the process of producing crystalline polypropylene using a catalyst comprised of the abovementioned solid titanium catalyst (a), organometallic compound (b), and electron donor (c).

In the prepolymerization process, an olefin is polymerized in the presence of solid titanium catalyst (a), organometallic compound (b) and optionally electron donor (c). As the olefin to be prepolymerized, straight chain olefins, such as ethylene, propylene, 1-butene, 1-octene, 1-hexadecene, 1-eicocene, etc., and olefins with a branched structure, such as 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, allylnaphthalene, allylnorbornane, styrene, dimethylstyrenes, vinylnaphthalenes, allyltoluenes, allylbenzene, vinylcyclohexane, vinylcyclopentane, vinylcycloheptane, allyltrialkylsilanes, etc., may be used and these may also be copolymerized.

Among the above, 3-methyl-1-butene, 3-methyl-1-pentene, 3-ethyl-1-hexene, vinylcyclohexane, allyltrimethylsilane, dimethylstyrene are especially preferred for use.

It is especially preferable to use the catalyst with which 3-methyl-1-butene is prepolymerized since the polypropylene that is produced will be high in rigidity.

It is desirable to perform the prepolymerization so that approximately 0.1 to 1000 g, preferably at approximately 0.3 to 500 g of polymer will be produced per 1 g of solid titanium catalyst component (a).

If the prepolymerization quantity is too large, the production efficiency of the (co)polymer in the main polymerization may drop and fish-eye may tend to occur easily in films, etc., formed from the (co)polymer obtained.

In the prepolymerization process, the catalyst can be used at a considerably higher concentration than the catalyst concentration in the system for the main polymerization.

It is usually desirable for the solid titanium catalyst component (a) to be used at a concentration in terms of titanium atoms per 1 liter of polymerization volume of approximately 0.01 to 200 millimoles, preferably at approximately 0.05 to 100 millimoles.

It is usually desirable for the organometallic compound (b) to be used at an amount of approximately 0.1 to 100 millimoles, preferably at approximately 0.5 to 50 millimoles per 1 mole of titanium atom in the solid titanium catalyst component (a).

Although the electron donor (c) may or may not be used in the prepolymerization, it can be used at an amount of 0.1 to 50 millimoles, preferably 0.5 to 30 millimoles, and preferably still at 1 to 10 millimoles per 1 mole of titanium atom in the solid titanium catalyst component (a).

It is preferable to perform the prepolymerization under mild conditions and by adding the olefin to be prepolymerized and the abovementioned catalyst to an inert hydrocarbon medium.

Examples of the inert hydrocarbon medium include aliphatic hydrocarbons, such as propane, butane, pentane, hexane, heptane, octane, decane, dodecane, kerosene, etc.; alicyclic hydrocarbons, such as cyclopentane, cyclohexane, methylcyclopentane, etc.; aromatic hydrocarbons, such as benzene, toluene, xylene, etc.; halogenated hydrocarbons, such as ethylene chloride, chlorobenzene, etc.; and mixtures of the above hydrocarbons. It is especially preferable to use an aliphatic hydrocarbon.

The prepolymerization temperature may be a temperature at which the prepolymer that is produced will not dissolve in practical terms in the inert hydrocarbon medium and is usually set to −20 to +100° C., preferably −20 to +80° C., and preferably still at 0 to +40° C.

The prepolymerization may be carried out by the batch method, continuous method, etc.

Hydrogen, etc., may be used in the prepolymerization process to adjust the molecular weight.

In the present invention, it is desirable to use the solid titanium catalyst component (a) (or the prepolymer catalyst) at an amount of approximately 0.0001 to 50 millimoles, preferable at approximately 0.001 to 10 millimoles in terms of titanium atoms per 1 liter of polymerization volume.

It is desirable to use the organometallic compound (b) at an amount of approximately 1 to 2000 moles, preferable at approximately 2 to 500 moles in terms of metal atom per 1 mole of titanium atom in the polymerization system. It is desirable to use the electron donor (c) at an amount of approximately 0.0001 to 50 moles, preferable at approximately 0.01 to 20 moles per 1 mole of metal atom in the organometallic compound (b).

In multiple-stage polymerization of polypropylene using the catalyst described above, the propylene may be copolymerized with a different monomer mentioned above in any stage or in all stages as long as the objects of the present invention are not spoiled.

In the present invention, it is preferable to polymerize the propylene in multiple stages and it is preferable to produce crystalline polypropylene of different molecular weight in each stage. For example, if the polymerization of propylene is to be performed in two stages, crystalline polypropylene of an intrinsic viscosity ($\eta_{1st}$) of 8 to 20 dl/g, preferably 8.5 to 15 dl/g can be produced in the first stage at an amount corresponding to 0.5 to 15 wt. % of the finally obtained crystalline polypropylene, and then crystalline polypropylene of an intrinsic viscosity ($\eta_{2nd}$) of 0.8 to 4.0 dl/g can be produced in the second stage at an amount corresponding to 99.5 to 85 wt. % of the finally obtained crystalline polypropylene.

Also for example, if the polymerization of propylene is to be performed in three stages, crystalline polypropylene of an intrinsic viscosity ($\eta_{1st}$) of 8 to 20 dl/g, preferably 8.5 to 15 dl/g can be produced in the first stage at an amount corresponding to 0.5 to 15 wt. % of the finally obtained crystalline polypropylene, and crystalline polypropylene of an intrinsic viscosity ($\eta_{2nd}$) of 3 to 10 dl/g, preferably 4 to 9 dl/g can then be produced in the second stage at an amount corresponding to 0.5 to 30 wt. % of the finally obtained crystalline polypropylene, and then crystalline polypropylene of an intrinsic viscosity ($\eta_{3rd}$) of 0.8 to 4.0 dl/g, preferably 0.8 to 3.0 dl/g can be produced in the third stage at an amount corresponding to 99 to 55 wt. % of the finally obtained crystalline polypropylene.

In this process, it is preferable that an inequality $$\{((\eta_{1st})+(\eta_{3rd}))/2\}-1 \leq (\eta_{2nd}) \leq \{((\eta_{1st})+(\eta_{3rd}))/2\}+1$$

be satisfied.

In each of the abovementioned stages, propylene is homopolymerized or propylene and another monomer are copolymerized to produce crystalline polypropylene, and it is desirable to produce a crystalline polypropylene that contains units derived from propylene at an amount of more than 90 mole %, preferably 95 to 100 mole % in each stage.

Though the order of the abovementioned stages is not specified in particular and the polymerization may be carried in an order that differs from those given above, the above orders are preferable.

The molecular weight of crystalline polypropylene obtained in each stage can be adjusted for example by changing the amount of hydrogen supplied to the polymerization system.

In the present invention, just the high molecular weight components of the crystalline polypropylene obtained by the above-described polymerization may be taken out and used as the crystalline polypropylene. The high molecular weight components of the crystalline polypropylene can be obtained as the components of the crystalline polypropylene obtained by polymerization that are insoluble in 85 to 125° C. decane, or to be more specific, as components that are precipitated at 85 to 125° C. upon dissolving said polypropylene and are then collected by hot filtration, etc. The chip contact method, etc., using seed polymer (chips) may be used for the precipitation of these components. In the chip contact method, the precipitation temperature of the high molecular weight components does not necessarily have to be set to the abovementioned temperature range.

In the present invention, in addition to the process of production of the crystalline polypropylene components by the above-described multiple-stage polymerization, a process of copolymerization of propylene and ethylene may be further carried out to form a propylene/ethylene copolymer rubber component and thereby produce the crystalline polypropylene of the present invention as a propylene block copolymer.

The polymerization may be carried out by a gas phase polymerization method or a liquid phase polymerization method, such as the solution polymerization method and suspension polymerization method, and a different method may be employed in each of the stages described above. The polymerization may also be carried out by any of the batchwise, semi-continuous, and continuous methods, and each of the above-described stages may be carried out in a plurality of polymerizers, for example, two to ten polymerizers.

An inert hydrocarbon may be used as the polymerization medium and liquid propylene may also be used as the polymerization medium.

With regard to the polymerization conditions of each stage, the polymerization temperature is suitably selected to be in the range of approximately −50 to 200° C., preferably at approximately 20 to 100° C., and the polymerization pressure is suitably selected to be in the range of normal pressure to 100 kg/cm², preferably at approximately 2 to 50 kg/cm².

In the polymerization process, it is desirable for the above-described solid titanium catalyst component (a) (or the prepolymer catalyst) to be used at a concentration in terms of titanium atoms per 1 liter of polymerization volume of approximately 0.0001 to 50 millimoles, preferably at approximately 0.001 to 10 millimoles.

It is desirable for the organometallic compound (b) to be used at an amount corresponding to approximately 1 to 2000 millimoles, preferably at approximately 2 to 500 millimoles in terms of metal atom per 1 mole of titanium atom in solid titanium catalyst component (a). It is desirable for the electron donor (c) to be used at an amount of approximately 0.001 to 50 millimoles, preferably at approximately 0.01 to 20 millimoles per 1 mole of metal atom in organometallic compound (b).

If a prepolymer catalyst has been used, the solid titanium catalyst component (a) and organometallic compound (b) may be added anew as necessary. The organometallic compound (b) used in prepolymerization and that used in main polymerization may be the same as or different from each other.

The electron donor (c) is used in at least one of either the prepolymerization process or the main polymerization process, and, for example, it is used in only the main polymerization process or in both the prepolymerization and main polymerization processes. The electron donor (c) used in prepolymerization and that used in the main polymerization may be the same as or different from each other.

The respective catalyst components described above do not have to be added anew in each of the processes that are carried out subsequently but may also be added as suitable.

When the catalyst described above is used, the degree of crystallization or the stereoregularity index of the polypropylene that is obtained will not be lowered and the catalyst activity will not be lowered even when hydrogen is used in the polymerization process.

In the present invention, since polypropylene can be produced at a high yield per unit quantity of the solid titanium catalyst component, the amount of the catalyst, and in particular the halogen content in the polypropylene can be reduced in a relative manner. The operation of removing the catalyst in the polypropylene can thus be omitted and rusting of the die will be unlikely to occur in the process of molding a molded product using the polypropylene obtained.

The crystalline polypropylene of the present invention may also be obtained by blending two or more types of crystalline polypropylenes of different intrinsic viscosity ($\eta$) produced using the above-described catalyst for production of highly stereoregular polypropylene. For example, the crystalline polypropylene may be obtained by blending 0.5 to 15 wt. % of crystalline polypropylene having an intrinsic viscosity ($\eta$) of 8 to 20 dl/g with 99.5 to 85 wt. % of crystalline polypropylene of an intrinsic viscosity ($\eta$) of 0.8 to 4.0 dl/g.

Polypropylene Composition

The polypropylene composition of the present invention is comprised of components soluble in 140° C. decane and optionally components insoluble in 140° C. decane and the components soluble in 140° C. decane that are also components insoluble in 64° C. decane are comprised of the crystalline polypropylene that satisfies the characteristics (1) to (4) given above.

The polypropylene composition of the present invention simply has to contain the crystalline polypropylene described above and components besides said crystalline polypropylene are not specified in particular.

The components soluble in 140° C. decane that are also components insoluble in 64° C. decane of the polypropylene composition are components that remain after eliminating inorganic filler and other components insoluble in 140° C. decane from the polypropylene composition, in other words, the components which precipitate at 64° C. upon separation of the components soluble in 140° C. decane by decane as was done with the crystalline polypropylene described above.

The elimination of components insoluble in 140° C. decane from the polypropylene composition is carried out as follows.

300 ml of decane, 500 cc of glass beads, and approximately 2 g of sample (polypropylene composition) are placed in a transparent flask set inside a constant temperature bath. Stirring is then performed while heating the constant temperature bath to approximately 146° C. to dissolve the sample (the sample solution becomes turbid at first).

When the sample solution becomes transparent, the decane solution, in which the polypropylene is dissolved, is transferred to a beaker of 1 liter while performing vacuum suction on said beaker to separate the components soluble at 140° C. from the components insoluble at 140° C. (If the sample solution that has been transferred to the beaker is colored at this time, the solution is returned to the flask, glass beads are added as necessary, and the solution is reheated to approximately 146° C. and stirred to dissolve the sample.)

Then in order to separate the components soluble at 140° C., the decane solution in the beaker from which the components insoluble in 140° C. decane have been removed in the above manner is combined with the wash liquid resulting from washing the interior of the flask by adding 150 ml of decane.

It is desirable for the polypropylene composition of the present invention to contain 70 wt. % or more of the components soluble in 140° C. decane.

It is desirable for the above-described crystalline polypropylene (components insoluble in 64° C. decane) to be contained in said components soluble in 140° C. decane at an amount of 60 wt. % or more, preferably 65 to 100 wt. %.

In addition to the crystalline polypropylene described above, the polypropylene composition may specifically contain, for example, rubber components, additives, other polymers, inorganic fillers, etc., as other components.

Of said other components, inorganic compounds, such as the inorganic filler are usually the components of the polypropylene composition that are insoluble in 140° C. decane while the organic compounds are usually the components of the polypropylene composition that are soluble in 140° C. decane.

The polypropylene composition of the present invention may contain rubber components for improving the impact strength, and it is desirable that this rubber component is an ethylene/α-olefin copolymer and/or a styrene copolymer.

Such a rubber component is a component of the polypropylene composition that is soluble in 140° C. decane and that is also a component that is soluble in 64° C. decane. Normally included among said components soluble in 64° C. decane are components soluble in 64° C. decane of the crystalline polypropylene itself (atatic polypropylene components and/or copolymer rubber components).

It is desirable that the ethylene/α-olefin copolymer is a random copolymer of ethylene and an α-olefin of 3 to 20 carbon atoms and to be an elastomer-like substance.

It is desirable that the ethylene/α-olefin copolymer contains 25 to 90 mole % of units derived from ethylene and 10 to 75 mole % of units derived from an a- olefin of 3 to 10 carbon atoms.

Examples of such α-olefins include propylene, 1-butene, 1-pentene, 1-hexene, 1-heptene, 1-octene, 1-decene, 1-dodecene, 1-hexadodecene, 4-methyl-1-pentene, etc.

Among the above, α-olefins of 4 to 10 carbon atoms are preferable.

The ethylene/α-olefin copolymer may also contain units derived from other polymerizable monomers as necessary and to the extent that will not spoil the characteristics of the present invention.

Examples of such other polymerizable monomers include vinyl compounds, such as styrene, vinylcyclopentene, vinylcyclohexane, vinylnorbornane, etc.; vinyl esters, such as vinyl acetate; unsaturated organic acids and derivatives thereof, such as maleic anhydride, etc.; conjugated dienes; and non-conjugated polyenes, such as 1,4-hexadiene, 1,6-octadiene, 2-methyl-1,5-hexadiene, 6-methyl-1,5-heptadiene, 7-methyl-1,6-octadiene, dicyclopentadiene, cyclohexadiene, dicyclooctadiene, methylene norbornene, 5-vinylnorbornene, 5-ethylidene-2-norbornene, 5-methylene-2-norbornene, 5-isopropylidine-2-norbornene, 6-chloromethyl-5-isopropenyl-2-norbornene, 2,3-diisopropylidene-5-norbornene, 2-ethylidene-3-isopropylidene-5-norbornene, 2-propenyl-2,2-norbornadiene, etc.

The ethylene/α-olefin copolymer may contain 10 mole % or less, preferably 5 mole % or less, and preferably still 3 mole % or less of the units derived from such other polymerizable monomers.

The ethylene/α-olefin copolymer may contain two or more types of units derived from α-olefins of 3 to 20 carbon atoms and may also contain two or more types of units derived from other polymerizable monomers.

It is desirable that the density of such an ethylene/α-olefin copolymer is 0.850 to 0.895 g/cm$^3$, preferably 0.855 to 0.890 g/cm$^3$.

It is desirable that the melt flow rate (MFR: ASTM D1238; 190° C., under a load of 2.16 kg) of the ethylene/α-olefin copolymer is 0.01 to 100 g/10 minutes, preferably 0.05 to 50 g/10 minutes.

It is preferable that the ethylene/α-olefin copolymer has an intrinsic viscosity (η) (measured in 135° C. decalin) of 1 to 5 dl/g, a glass transition temperature Tg of –50° C. or less, and a density of 0.850 to 0.900 g/cm$^3$.

Specific examples of such an ethylene/α-olefin copolymer include ethylene/propylene random copolymer, ethylene/1-butene random copolymer, ethylene/propylene/1-butene random copolymer, ethylene/propylene/ethylidene-norbornene random copolymer, ethylene/1-hexene random copolymer, ethylene/1-octene random copolymer, etc. Among these, the ethylene/propylene random copolymer, ethylene/1-butene random copolymer, and ethylene/1-octene random copolymer can be used especially preferably and two or more of these may be used in combination.

The ethylene/α-olefin copolymer may be produced by a conventionally known method using a vanadium catalyst, titanium catalyst, or metallocene catalyst, etc. The above-described ethylene/α-olefin copolymer is excellent in compatibility with the above-described polypropylene, and a polypropylene composition with excellent impact resistance and excellent fluidity as well as excelent rigidity can be formed from these components.

It is desirable that the styrene copolymer is a styrene block copolymer comprised of block polymer units derived from an aromatic vinyl and block polymer units derived from a conjugated diene.

Specific examples of aromatic vinyls that form this styrene copolymer include styrene, α-methylstyrene, 3-methylstyrene, p-methylstyrene, 4-propylstyrene, 4-dodecylstyrene, 4-cyclohexylstyrene, 2-ethyl-4-benzylstyrene, 4-(phenylbutyl)styrene, 1-vinylnaphthalene, 2-vinylnaphthalene, etc. Among these, styrene is preferable.

It is desirable that the styrene copolymer used in the present invention contains 5 to 80 wt. %, preferably 8 to 80 wt. % of aromatic vinyl polymer units. The aromatic vinyl unit content can be measured using the usual methods, such as the infrared spectroscopy method, NMR spectroscopy method, etc.

Examples of conjugated dienes include butadiene, isoprene, pentadiene, 2,3-dimethylbutadiene, and combinations of the above. Among these, isoprene and combinations of butadiene and isoprene are preferable.

In the case where the conjugated diene block polymer unit is formed from butadiene and isoprene, it is preferable that units derived from isoprene is contained at an amount of 40 mole % or more.

The conjugated diene block polymer unit thus comprised of butadiene/isoprene copolymer units may be a random copolymer unit, a block copolymer unit, or a tapered copolymer unit of butadiene and isoprene.

In the present invention, all or part of the carbon-carbon double bonds in the conjugated diene block polymer unit may be hydrogenated.

Though the hydrogenation ratio is determined according to the desired heat resistance, weather resistance, etc., said ratio can be 50% or more, preferably 70% or more. If heat resistance and weather resistance are especially required of the resin composition of the present invention, it is preferable that the hydrogenation ratio is 80% or more.

The form of the styrene block copolymer thus comprised of an aromatic vinyl block polymer unit (X) and a conjugated diene block polymer unit (Y) is indicated for example as $X(YX)_n$ or $(XY)_n$ [where n is an integer greater than or equal to 1].

Among the above, copolymers of the form $X(YX)_n$ and especially of the form X-Y-X are preferable, and to be more specific, polystyrene/polyisoprene (or isoprene/butadiene)/polystyrene block copolymers are preferable.

In such a styrene block copolymer, the aromatic vinyl block units (X), which are hard segments, exist as crosslinkage points for the conjugated diene rubber block units (Y) to form a physical crosslink (domain). The conjugated diene rubber block unit (Y) that exists between the aromatic vinyl block units (X) is a soft segment and has rubber elasticity.

The copolymerized diene units of the styrene block copolymer obtained in the above manner are hydrogenated as necessary by a known method.

Specific examples of styrene copolymers used in the present invention include:

styrene/isoprene block copolymers (SI) and their hydrogenated forms (SEP), styrene/isoprene/styrene block copolymers (SIS) and their hydrogenated forms (SEPS; polystyrene-polyethylene/propylene-polystyrene block copolymers), styrene/butadiene copolymers (SB) and their hydrogenated forms (SEB), styrene/butadiene/styrene block copolymers (SBS) and their hydrogenated forms (SEBS; polystyrene-polyethylene/butylene-polystyrene copolymer), etc., and to be more specific, include HYBRAR (made by Kuraray Co., Ltd.), Kraton (trade name; made by Shell Chemical Co., Ltd.,), Cariflex TR (made by Shell Chemical Co., Ltd.), Solprene (made by Phillips Petroleum Co.), Europene SOLT (made by ANIC Co.), Tufprene (made by Asahi Chemical Co., Ltd.), Solprene-T (made by Japan Elastomer Co.), JSRTR (made by Japan Synthetic Rubber Co.), Denka STR (made by Denki Kagaku Co.), Quintac (made by Nihon Zeon Co.), Kraton G (made by Shell Chemical Co., Ltd.), Tuftech (made by Asahi Chemical Co., Ltd.) (All of the above are trade names.), etc.

Among the above, SEBS, SEPS, etc. are used preferably.

It is desirable that the styrene copolymer used in the present invention normally has a melt flow rate (MFR: ASTM D1238, 200° C., under load of 2.16 kg) of 0.1 to 150 g/10 minutes and an intrinsic viscosity (η) (in 135° C. decalin) of 0.01 to 10 dl/g, preferably 0.08 to 7 dl/g.

It is also desirable that the crystallinity as measured by the X-ray diffraction method is 0 to 10%, preferably 0 to 7%, and preferably still 0 to 5%.

It is desirable that the density is 0.88 to 0.94 g/cm³.

Two or more types of the abovementioned styrene copolymers may be used in combination.

Also in the present invention, an ethylene/α-olefin copolymer and a styrene copolymer may be used in combination.

In preparing the polypropylene composition of the present invention, an abovementioned ethylene/α-olefin copolymer and/or styrene copolymer may be used at an amount of 0 to 70 parts by weight, preferably 0 to 50 parts by weight based on 100 parts by weight of crystalline polypropylene.

Additives that may be contained in the polypropylene composition of the present invention include nucleating agents, antioxidants, hydrochloric acid absorbents, heat-proofing stabilizers, weathering agents, light stabilizers, ultraviolet absorbing agents, slip agents, anti-blocking agents, anti-fogging agents, lubricants, antistatic agents, flame retardants, pigments, dyes, dispersing agents, copper deactivators, neutralizers, foaming agents, plasticizing agents, anti-foaming agents, crosslinking agents, flow property improving agents, such as peroxides, etc., weld strength improving agents, natural oils, synthetic oils, waxes, etc.

It is especially preferable that the polypropylene composition of the present invention contains a nucleating agent, and this nucleating agent may be the abovementioned prepolymer that is contained in the polypropylene. Also, various other known nucleating agents may be contained and both such nucleating agents and said prepolymer may be contained. By containing such nucleating agents, the crystal particles are made fine and the crystallization rate is improved to enable high-speed molding.

Although various conventionally known nucleating agents can be used without restriction as the nucleating agent besides the prepolymer, nucleating agents of the following formula can be used preferably in particular.

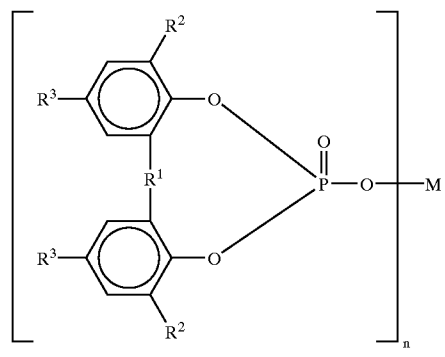

(In the above formula, $R^1$ indicates oxygen, sulfur, or a hydrocarbon group of 1 to 10 carbon atoms, and $R^2$ and $R^3$ may be the same as or different from each other of each indicating hydrogen or a hydrocarbon group of 1 to 10 carbon atoms. The $R^2$'s may be bonded with each other to form a ring, the $R^3$'s may be bonded with each other to form a ring, and $R^2$ and $R^3$ may be bonded together to form a ring. M indicates a metal atom of valence 1 to 3 and n is an integer with a value of 1 to 3.) Specific examples include sodium-2,2'-methylene-bis(4,6-di-t-butylphenyl)phosphate, sodium-2,2'-ethylidene-bis(4,6-di-t-butylphenyl)phosphate, lithium-2,2'-methylene-bis-(4,6-di-t-butylphenyl)phosphate, lithium-2,21-ethylidene-bis(4,6-di-t-butylphenyl) phosphate, sodium-2,2'-ethylidene-bis(4-i-propyl-6-t-butylphenyl)phosphate, lithium-2,2'-methylene-bis(4-methyl-6-t-butylphenyl)phosphate, lithium-2,2'-methylene-bis(4-ethyl-6 -t-butylphenyl)phosphate, calcium-bis[2,2'-thiobis(4-methyl-6-t-butylphenyl)phosphate], calcium-bis[2,2'-thiobis(4-ethyl-6-t-butylphenyl)phosphate], calcium-bis[2,2'-thiobis-(4,6-di-t-butylphenyl)phosphate], magnesium-bis[2,2'-thiobis(4,6-di-t-butylphenyl) phosphate], magnesium-bis[2,2'-thiobis(4-t-octylphenyl) phosphate], sodium-2,2'-butylidene-bis(4,6-di-methylphenyl)phosphate, sodium-2,2'-butylidene-bis(4,6-di-t-butylphenyl)phosphate, sodium-2,2'-t-octylmethylene-bis(4,6-di-methylphenyl)phosphate, sodium-2,21-t-octylmethylene-bis(4,6-di-t-butylphenyl)phosphate, calcium-bis(2,2'-methylene-bis(4,6-di-t-butylphenyl) phosphate), magnesium-bis[2,2'-methylene-bis(4,6-di-t-butylphenyl)phosphate], barium-bis[2,2'-methylene-bis(4,6-di-t-butylphenyl)phosphate], sodium-2,2'-methylene-bis(4-methyl-6-t-butylphenyl)phosphate, sodium-2,2'-methylene-bis(4-ethyl-6-t-butylphenyl)phosphate, sodium (4,4'-dimethyl-5,6'-di-t-butyl-2,2'-biphenyl)phosphate, calcium-bis[(4,4'-dimethyl-6,6'-di-t-butyl-2,2'-biphenyl)phosphate], sodium-2,2'-ethylidene-bis(4-m-butyl-6-t-butylphenyl) phosphate, sodium-2,2'-methylene-bis(4,6-di-methylphenyl)phosphate, sodium-2,2'-methylene-bis(4,6-di-ethylphenyl)phosphate, potassium-2,2'-ethylidene-bis(4, 6-di-t-butylphenyl)phosphate, calcium-bis[2,2'-ethylidene-bis-(4,6-di-t-butylphenyl)phosphate], magnesium-bis[2,2'-ethylidene-bis[4,6-di-t-butylphenyl)phosphate], barium-bis [2,2'-ethylidene-bis(4,6-di-t-butylphenyl)phosphate], aluminum-tris[2,2'-methylene-bis(4,6-di-t-butylphenyl) phosphate], aluminum-tris[2,2'-ethylidene-bis(4,6-di-t-butylphenyl)phosphate, and mixtures of two or more of the above.

Among the above, sodium-2,2'-methylene-bis(4,6-di-t-butylphenyl)phosphate is particularly preferable.

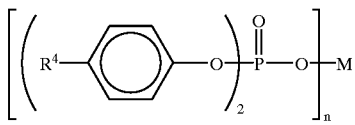

(In the above formula, $R^4$ indicates hydrogen or a hydrocarbon group of 1 to 10 carbon atoms, M indicates a metal atom of a valence of 1 to 3, and n indicates an integer of value 1 to 3.)

Specific examples include sodium-bis(4-t-butylphenyl) phosphate, sodium-bis(4-methylphenyl)phosphate, sodium-bis(4-ethylphenyl)phosphate, sodium-bis(4-i-propylphenyl) phosphate, sodium-bis(4-t-octylphenyl)phosphate, potassium-bis(4-t-butylphenyl)phosphate, calcium-bis(4-t-butylphenyl)phosphate, magnesium-bis(4-t-butylphenyl) phosphate, lithium-bis(4-t-butylphenyl)phosphate, aluminum-bis(4-t-butylphenyl)phosphate, and mixtures of two or more of the above.

Among the above, sodium-bis(4-t-butylphenyl)phosphate is preferred.

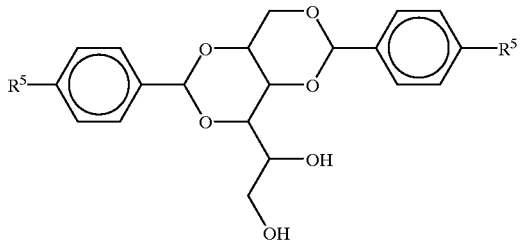

(In the above formula, $R^5$ indicates hydrogen or a hydrocarbon group of 1 to 10 carbon atoms.) Specific examples include 1,3,2,4-dibenzylidenesorbitol, 1,3-benzylidene-2,4-p-methylbenzylidenesorbitol, 1,3-benzylidene-2,4-p-ethylbenzylidenesorbitol, 1,3-p-methylbenzylidene-2,4-benzylidenesorbitol, 1,3-p-ethylbenzylidene-2,4-benzylidenesorbitol, 1,3-p-methylbenzylidene-2,4-p-ethylbenzylidenesorbitol, 1,3-p-ethylbenzylidene-2,4-p-methylbenzylidenesorbitol, 1,3,2,4-di(p-methylbenzylidene)sorbitol, 1,3,2,4-di(p-ethylbenzylidene) sorbitol, 1,3,2,4-di(p-n-propylbenzylidene)sorbitol, 1,3,2,4-di(p-i-propylbenzylidene)sorbitol, 1,3,2,4-di(p-n-butylbenzylidene)sorbitol, 1,3,2,4-di(p-s-butylbenzylidene) sorbitol, 1,3,2,4-di(p-t-butylbenzylidene)sorbitol, 1,3,2,4-di (2'-4'-dimethylbenzylidene)sorbitol, 1,3,2,4-di(p-methoxybenzylidene)sorbitol, 1,3,2,4-di(p-ethoxybenzylidene)sorbitol, 1,3-benzylidene-2,4-p-chlorobenzylidenesorbitol, 1,3-p-chlorobenzylidene-2,4-benzylidenesorbitol, 1,3-p-chlorobenzylidene-2,4-p-methylbenzylidenesorbitol, 1,3-p-chlorobenzylidene-2,4-p-ethylbenzylidenesorbitol, 1,3-p-methylbenzylidene-2,4-p-chlorobenzylidenesorbitol, 1,3-p-ethylbenzylidene-2,4-p-chlorobenzylidenesorbitol, 1,3,2,4-di(p-chlorobenzylidene) sorbitol, and mixtures of two or more of the above.

Among the above, 1,3,2,4-dibenzylidenesorbitol, 1,3,2,4-di(p-methylbenzylidene)sorbitol, 1,3,2,4-di(p-ethylbenzylidene)sorbitol, 1,3-p-chlorobenzylidene-2,4-p-methylbenzylidenesorbitol, and 1,3,2,4-di(p-chlorobenzylidene)sorbitol, and mixtures of two or more of these are preferred.

The nucleating agents include metal salts of aromatic carboxylic acids and fatty carboxylic acids, such as aluminum benzoate, aluminum p-t-butylbenzonate, sodium adipate, sodium thiophenecarboxylate, sodium pyrolecarboxylate, etc. Talc and other inorganic compounds mentioned below may also be used as nucleating agents.

In preparing the polypropylene composition, it is desirable to use about 0.001 to 10 parts by weight, preferably 0.01 to 5 parts by weight, and preferably still 0.1 to 3 parts by weight of the abovementioned nucleating agents based on 100 parts by weight of polypropylene.

Phenol antioxidants, sulfur antioxidants, and phosphorus antioxidants can be used as the antioxidant.

Examples of phenol antioxidants include phenols, such as 2,6-di-tert-butyl-p-cresol (3,5-di-tert-butyl-4-hydroxytoluene), stearyl(3,3-dimethyl-4-hydroxybenzyl) thioglycolate, stearyl-β-(4-hydroxy-3,5-di-tert-butylphenol) propionate, distearyl-3,5-di-tert-butyl-4-hydroxybenzyl phosphonate, 2,4,6-tris(3',5'-di-tert-butyl-4'-hydroxybenzylthio)-1,3,5-triazine, distearyl (4-hydroxy-3-methyl-5-tert-butylbenzyl)malonate, 2,2'-methylene-bis(4-methyl-6-tert-butylphenol), 4,4'-methylene-bis(2,6-di-tert-butylphenol), 2,2'-methylene-bis-[6-(1-methylcyclohexyl)p-cresol], bis[3,5-bis[4-hydroxy-3-tert-butylphenyl)butyric acid]glycol ester, 4,4'-butylidene-bis(6-tert-butyl-m-cresol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butyl)benzyl isocyanurate, 1,3,5-tris(3,5-di-tert-butyl-4-hydroxybenzyl)-2,4,6-trimethylbenzene, tetrakis methylene-3-(3,5-di-tert-butyl-4-hydroxyphenyl) propionatelmethane, 1,3,5-tris(3,5-di-tert-butyl-4-hydroxybenzyl)isocyanurate, 1,3,5-tris[(3,5-di-tert-butyl-4-hydroxyphenyl)propionyloxyethyl]isocyanurate, 2-octylthio-4,6-di(4-hydroxy-3,5-di-tert-butyl)phenoxy-1,3,5-triazine, 4,4'-thiobis(6-tert-butyl-m-cresol), etc.; and polyphenol oligocarbonates, such as the oligocarbonate (of degree of polymerization of 2 to 10) of 4,4'-butylidene-bis (2-tert-butyl-5-methylphenol).

Examples of sulfur antioxidants include dialkyl thiodipropionates, such as dilauryl-, dimyristyl- and distearyl-thiodipropionates, and polyalcohol (for example, glycerine, trimethylolethane, trimethylolpropane, pentaerythritol, trishydroxyethyl isocyanurate) esters of butyl-, octyl-, lauryl-, stearyl-, and other alkyl thiopropionic acid (for example, pentaerythritol tetralauryl thiopropionate).

Examples of phosphorus antioxidants include trioctyl phosphite, trilauryl phosphite, tridecyl phosphite, octyl-diphenyl phosphite, tris(2,4-di-tert-butylphenyl)phosphite, triphenyl phosphite, tris(butoxyethyl)phosphite, tris (nonylphenyl)phosphite, distearyl pentaerythritol diphosphite, tetra(tridecyl)-1,1,3-tris(2-methyl-5-tert-butyl-4-hydroxyphenyl)butane diphosphite, tetra($C_{12}$–$C_{15}$ mixed alkyl)-4,4'-isopropylidene diphenyl diphosphite, tetra (tridecyl)-4,4'-butylidene bis(3-methyl-6-tert-butylphenol) diphosphite, tris(3,5-di-tert-butyl-4-hydroxyphenyl) phosphite, tris(mono.di mixed nonylphenyl)phosphite, hydrogenated-4,4'-isopropylidene diphenol polyphosphite, bis(octylphenyl).bis[4,4'-butylidene-bis(3-methyl-6-tert-butylphenol)].1,6-hexanediol diphosphite, phenyl.4,4'-isopropylidene diphenol-pentaerythritol diphosphite, bis(2,4-di-tert-butylphenyl)pentaerythritol diphosphite, bis(2,6-di-tert-butyl-4-methylphenyl)pentaerythritol diphosphite, tris[4,4'-isopropylidene-bis(2-tert-butylphenol)]phosphite, phenyl.disodecyl phosphite, di(nonylphenyl)pentaerythritol diphosphite), tris(1,3-di-stearoyloxyisopropyl)phosphite, 4,4'-isopropylidene-bis(2-tert-butylphenol).di(nonylphenyl) phosphite, 9,10-di-hydro-9-oxa-9-oxa-10-phosphaphenanthrene-10-oxide, tetrakis(2,4-di-tert-butylphenyl)-4,4'-biphenylene diphosphonite, etc.

Other antioxidants that can be used include, 6-hydroxycoumarone derivatives, such as α, β, γ, and δ tocopherols and their mixtures, the 2,5-dimethyl-substituted form, 2,5,8-trimethyl-substituted form, and 2,5,7,8-tetramethyl-substituted form of 2-(4-methyl-penta-3-enyl)-6-hydroxycoumarone, 2,2,7-trimethyl-5-tert-butyl-6-hydroxycoumarone, 2,2,5-trimethyl-7-tert-butyl-6-hydroxycoumarone, 2,2,5-trimethyl-6-tert-butyl-6-hydroxycoumarone, 2,2-dimethyl-5-tert-butyl-6-hydroxycoumarone, etc.

Furthermore, a double compound of the general formula, $M_xAl_y(OH)_{2x+3y-2z}(A)z.aH_2O$ (wherein M is Mg, Ca, or Zn, A is an anion other than the hydroxide group, x, y, and z are positive numbers, and a is 0 or a positive number), for example, $Mg_6Al_2(OH)_{16}CO_3.4H_2O$,
$Mg_5Al_2(OH)_{14}CO_3.4H_2O$,
$Mg_{10}Al_2(OH)_{22}(CO_3)_2.4H_2O$,
$Mg_6Al_2(OH)_{16}HPO_4.4H_2O$,
$Ca_6Al_2(OH)_{16}CO_3.4H_2O$,
$Zn_6Al_2(OH)_{16}CO_3.4H_2O$,
$Zn_6Al_2(OH)_{16}SO_4.4H_2O$,
$Mg_6Al_2(OH)_{16}SO_3.4H_2O$, etc., can be contained as the hydrochloric acid absorbent.

Examples of light stabilizers include hydroxybenzophenones, such as 2-hydroxy-4-methoxybenzophenone, 2-hydroxy-4-n-octoxybenzophenone-2,2'-di-hydroxy-4-methoxybenzophenone, 2,4-dihydroxybenzophene, etc.; benzotriazoles, such as 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-5'-methylphenyl)benzotriazole, 2-(21-hydroxy-3',5'-di-tert-amylphenyl)benzotriazole, etc.; benzoates, such as phenylsalicylate, p-tert-butylphenylsalicylate, 2,4-di-tert-butylphenyl-3,5-di-tert-butyl-4-hydroxybenzoate, hexadecyl-3,5-di-tert-butyl-4-hydroxybenzoate, etc.; nickel compounds, such as the Ni salt of 2,2'-thiobis(4-tert-octylphenol), [2,2'-thiobis(4-tert-octylphenolate)]-n-butylamine Ni, Ni salt of (3,5-di-tert-butyl-4-hydroxybenzyl)phosphonic acid monoethyl ester, etc.; substituted acrylonitriles, such as methyl α-cyano-β-methyl-β-(p-methoxyphenyl)acrylate, etc.; oxalyldianilides, such as N'-2-ethylphenyl-N-ethoxy-5-tert-butylphenyloxalyldiamide, N-2-ethylphenyl-N'-2-ethoxyphenyloxalyldiamide, etc.; and hindered amine compounds, such as bis(2,2,6,6-tetramethyl-4-piperidine) sebaceate, poly[{((6-(1,1,3,3-tetramethylbutyl)imino}-1,3,5-triazine-2,4-diyl{4-(2,2,6,6-tetramethylpiperidyl)imino}hexamethylene], condensate of 2-(4-hydroxy-2,2,6,6-tetramethyl-1-piperidyl)ethanol and dimethyl succinate, etc.

Examples of lubricants include aliphatic hydrocarbons, such as paraffin wax, polyethylene wax and polypropylene wax; higher fatty acids, such as capric acid, lauric acid, myristic acid, palmitic acid, margaric acid, stearic acid, arachidic acid and behenic acid, and metal salts thereof (for example, lithium salt, calcium salt, sodium salt, magnesium salt, potassium salt); fatty alcohols, such as palmityl alcohol, cetyl alcohol and stearyl alcohol; fatty amides, such as capronamide, caprylamide, caprinamide, laurylamide, myristamide, palmitamide and stearamide; fat and alcohol esters; and fluorine compounds, such as fluoroalkylcarboxylic acids and metal salts thereof, metal salts of fluoroalkylsulfonic acid, etc.

The above additives can be used at an amount of 0.0001 to 10 parts by weight per 100 parts by weight of crystalline polypropylene.

The polypropylene composition of the present invention may also contain 30 wt. % or less of inorganic filler.

Specific examples of inorganic fillers include powder fillers, including natural silicic acids and silicates, such as fine powder talc, kaolinite, baked clay, pyrophyllite, sericite, wollastonite, etc., carbonates, such as precipitated calcium carbonate, limestone powder whiting, magnesium carbonate, etc., hydroxides, such as aluminum hydroxide, magnesium hydroxide, etc., oxides, such as zinc oxide, zinc white, magnesium oxide, etc., barium sulfate, and synthetic silicic acids and silicates, such as hydrated calcium silicate, hydrated aluminum silicate, hydrated silicic acid, silicic anhydride, etc., flake-form fillers, such as mica, fibrous fillers, such as glass fiber, basic magnesium sulfate whiskers, calcium titanate whiskers, aluminum borate whiskers, sepiolite, PMF (processed mineral fiber), xonotolite, potassium titanate, ellestadite, etc., and balloon-form fillers, such as glass balloons, fly ash balloons, etc.

Among the above, talc, calcium carbonate, glass fiber, potassium titanate, and barium sulfate, etc. are used preferably in the present invention, and fine powder talc having an average particle size of 0.01 to 10 μm is especially preferable for use.

The average particle size of talc can be measured by the liquid phase sedimentation method.

The inorganic filler, in particular, the talc that is used in the present invention may be non-treated or may be surface treated in advance. Specific examples of surface treatment include chemical or physical treatment using silane coupling agents, higher fatty acids, metal salts of fatty acids, unsaturated organic acids, organic titanates, resin acids, polyethylene glycol, and other treatment agents. When talc provided with such surface treatment is used, a propylene polymer composition that is excellent in weld strength, coating properties, and forming properties can be obtained.

Two or more of the above types of inorganic filler may be used in combination.

Also in the present invention, organic fillers such as high styrenes, lignin and reclaimed rubber may be used along with inorganic fillers such as those mentioned above.

Since the polypropylene composition of the present invention contains such additives, nucleating agents, rubber components, fillers, etc., a molded product can be formed that is further improved in balance of physical properties, durability, coating properties, printing properties, flaw resistance, and forming properties.

The polypropylene composition may be produced by kneading the above-described propylene, additives, rubber components, inorganic filler, and other components by use of known methods.

Thermoformed Product

The above-described crystalline polypropylenes and polypropylene compositions of the present invention (shall be referred to hereinafter simply as "polypropylenes") can be used widely in conventionally known polyolefin applications, and in particular, the polypropylenes may be molded and used, for example, as sheets, unstretched or stretched films, filaments, and molded products of various other shapes.

Specific examples of molded products include molded products obtained by such known thermoforming methods as extrusion molding, injection molding, inflation molding, blow molding, extrusion blow molding, injection blow molding, press molding, vacuum forming, calendering, foam molding, etc. A few examples shall be given below to describe such molded products.

When for example the molded product of the present invention is an extrusion molded product, the shape and type of the product is not limited in particular, and sheets, films (unstretched), pipes, hoses, electric cable jackets, filaments, etc., can be given as examples. Especially preferred are sheets, films, and filaments.

Conventionally known extrusion devices and molding conditions can be employed in extrusion molding the polypropylene. The molten polypropylene can be extruded from a T die, etc., using, for example, a single-axis screw extruder, kneading extruder, ram extruder, gear extruder, etc., and formed into a sheet or a film (unstretched).

Stretched films can be obtained by stretching the above-mentioned extruded sheet or extruded film (unstretched) by the tenter method (longitudinal-transverse stretching, transverse-longitudinal stretching), simultaneous biaxial stretching method, uniaxial method, or other known stretching method.

The draw ratio in the stretching of a sheet or unstretched film is usually about 20 to 70 times in the case of biaxial stretching and usually about 2 to 10 times in the case of uniaxial stretching. It is desirable to obtain a stretched film of about 5 to 200 μm thickness by stretching.

As another example of formed product of film form, inflation films may also be manufactured. Drawdown is unlikely to occur in the process of inflation molding.

The above-described sheets and film molded products, obtained from the polypropylenes of the present invention, do not become charged easily, are excellent in tensile modulus and other rigidity characteristics, heat resistance, impact resistance, aging resistance, transparency, see-through properties, gloss, rigidity, moisture proof, and gas barrier properties, and can be used widely as packaging film, etc. Since these sheets and films are particularly excellent in moisture proof, they can be used preferably in press through packs, etc., that are used as packaging material for drug tablets, capsules, etc.

Filament molded products can be produced for example by extruding the molten polypropylene through a spinning nozzle. A filament thus obtained can be further stretched. It is sufficient that this stretching be performed so that the molecules become oriented in at least one axial direction of the filament. It is usually desirable to perform stretching to attain a draw ratio of about 5 to times. Filaments obtained from the polypropylenes of the present invention do not become charged readily and are excellent in rigidity, heat resistance, and impact resistance.

Injection molded products can be produced by injection molding the polypropylene into various shapes using conventionally known injection molding equipment and employing known conditions. Injection molded products, obtained from the polypropylenes of the present invention do not become charged readily, are excellent in rigidity, heat resistance, impact resistance, surface gloss, resistance against chemicals, wear resistance, etc., and can be used widely as interior automotive trim material, exterior automotive trim material, housing for household electric products, various types of containers, etc.

Blow molded products can be manufactured by blow molding the polypropylene using conventionally known blow molding equipment and employing known conditions. For example in extrusion blow molding, an abovementioned polypropylene is extruded from a die in the molten condition where the resin temperature is 100° C. to 300° C. to form a tube-shaped parison. After then retaining the parison in a mold of the desired shape, air is blown in to make the parison fit the mold at a resin temperature of 130° C. to 300° C. and thereby form a hollow molded product. It is desirable that the draw (blow) ratio is 1.5 to 5 times in the transverse direction.

In injection blow molding, an abovementioned polypropylene is injected into a parison-mold in the molten condition where the resin temperature is 100° C. to 300° C. to form a parison. After then retaining the parison in a mold of the desired shape, air is blown in to make the parison fit the mold at a resin temperature of 120° C. to 300° C. and thereby form a hollow molded product. In obtaining the hollow molded product, it is desirable that the draw (blow) ratio is 1.1 to 1.8 times in the longitudinal direction and 1.3 to 2.5 times in the transverse direction.

Blow molded products, obtained from the polypropylenes of the present invention, are excellent in rigidity, heat resistance, impact resistance, as well as in moisture proof.

Mold stamping molded products can be given as examples of press molded products. Polypropylene of the present invention can be used for example as the base material used in a composite integral molding (mold stamping molding) process wherein the base material and a skin material are press molded simultaneously. Specific examples of such mold stamping molded products include door trims, rear package trims, seat back garnishes, instrument panels, and other interior automotive trim materials.

Since the polypropylenes of the present invention exhibit high rigidity and, for example, exhibit sufficiently high rigidity even when containing rubber components, the polypropylenes can be used in various applications that require high rigidity. In particular, the polypropylenes of the present invention can be used preferably in such applications as interior and exterior automotive trim material, housing for household electric goods, and various containers.

Press molded products made of the polypropylenes of the present invention do not become charged readily and are excellent in rigidity, heat resistance, impact resistance, aging resistance, surface gloss, resistance against chemicals, wear resistance, etc.

Effects of the Invention

The crystalline polypropylenes and polypropylene compositions of the present invention contain crystalline polypropylene components of high molecular weight and crystalline components having specific physical properties, and are therefore extremely high in rigidity. Also, the crystalline polypropylenes and polypropylene compositions of the present invention are excellent in hardness, rigidity, melt tension, fluidity, and molding properties.

Such crystalline polypropylenes and polypropylene compositions of the present invention can be used in a wide variety of applications requiring high rigidity, and can be used preferably for example as materials for household electric goods such as housing, washing tubs, etc., film materials, such as uniaxially stretched films, biaxially stretched films, inflation films, etc., sheet materials made by calendering, extrusion molding, etc., container materials for bags, retort containers, interior automotive trim materials for trims, instrumental panels, column covers, etc., exterior automotive trim materials for fenders, bumpers, chenille, mud guards, mirror covers, etc., sundry goods, etc.

EXAMPLE

Though the present invention shall now be described more specifically by way of examples, the present invention is not limited to these examples.

The physical properties of polypropylene or polypropylene composition, indicated in the description of the examples, were measured as follows.

(Intrinsic viscosity (η))

The limiting viscosity (η) was measured in ecahydronaphthalene a t 135° C.

(Weight-average Molecular Weight (Mw), z-average Molecular Weight (Mz))

The weight-average molecular weight (Mw) and z-average molecular weight (Mz) were determined from gel permeation chromatography (GPC) measurements made at 140° C. using o-dichlorobenzene as the solvent.

(Melt Viscoelasticity)

The frequency dependent loss tangent of the components insoluble in 64° C. decane of the polypropylene was measured using RDS-11 made by Reometrix Co.

Using a disk-shaped sheet of 2 mm thickness and 2.5 mm radius that was press molded at 230° C., the loss tangent (tan $\delta_{0.05}$) at a frequency of 0.05 rad/sec and the loss tangent (tan $\delta_{10}$) at a frequency of 10 rad/sec were measured at 230° C. and under constant strain.

The value of the melt viscoelasticity index D was then determined using the aforementioned formula from the respective frequencies and measured loss tangent values.

(Flexure Modulus Test (FM))

Using a test piece that was injection molded under predetermined conditions, the flexure modulus was measured at a test temperature of 23° C., span interval of 51 mm, and flexing rate of 20 mm/minute in compliance with ASTM D790.

[Melt Tension (MT)]

The melt tension was measured as the tension applied to a filament when an extruded strand is pulled at a constant rate using the Melt Tension Tester (made by Toyo Seiki) and under conditions of a measurement temperature of 200° C. and extrusion rate of 15 mm/minute.

(Pencil Hardness)

The pencil hardness was measured in compliance with JIS K5401.

Example 1

Production of Homopolypropylene (PP-1)

(Preparation of Solid Titanium Catalyst Component (a))

A mixture of 95.2 g of anhydrous magnesium chloride, 442 ml of decane, and 390.6 g of 2-ethylhexyl alcohol was heated for 2 hours at 130° C. to obtain a uniform solution. To the solution was added 21.3 g of phthalic anhydride, and further stirring and mixing were carried out for 1 hour at 130° C. to dissolve the phthalic anhydride.

After cooling the uniform solution thus obtained to 23° C., 75 ml of the uniform solution were dripped over 1 hour into 200 ml of titanium tetrachloride kept at −20° C. After the dripping process, the temperature of the mixed solution obtained was raised to 110° C. over 4 hours. When the temperature was reached to 110° C., 5.22 g of diisobutyl phthalate (DIBP) were added and the mixture was then kept at said temperature while stirring for 2 hours. The solid components were then collected by hot filtration, resuspended in 275 ml of titanium tetrachloride, and then heated again for 2 hours at 110° C.

After heating ended, the solid components were collected by hot filtration again and washed using decane and hexane at 110° C. until titanium compounds were no longer detected in the wash liquid.

The solid titanium catalyst component (a) that was prepared in the above manner was preserved as a hexane slurry and a portion was dried to examine the catalyst composition.

The solid titanium catalyst component (a) contained 2.5 wt. % of titanium, 58 wt. % of chlorine, 18 wt. % of magnesium, and 13.8 wt. % of DIBP.

(Preparation of Prepolymer Catalyst)

To a 2 liter autoclave with stirrer were introduced 500 ml of refined hexane, 120 g of 3-methyl-1-butene, 50 millimoles of triethylaluminum, 50 millimoles of trimethylmethoxysilane, and an amount of the above-obtained solid titanium catalyst component (a) corresponding to 5.0 millimoles in terms of titanium atom under a nitrogen atmosphere. A polymerization reaction was performed for 8 hours. The polymerization temperature was maintained at 20° C.

After the end of polymerization, the interior of the reactor was replaced with nitrogen, and then a washing operation, comprised of removing the supernatant and adding refined hexane, was performed three times. The prepolymer catalyst (B)-1 that was obtained was then resuspended in refined hexane and the entire amount was transferred into a catalyst bottle.

A prepolymer catalyst containing 10.4 g of poly(3-methyl-1-butene) per 1 g of solid titanium catalyst component (a) was obtained.

(Polymerization)

3 kg of propylene were placed in an autoclave with an inner volume of 17 liter and after raising the temperature to 60° C., 7.0 millimoles of triethylaluminum, 7.0 millimoles of dicyclopentyldimethoxysilane, and 2.28 g of the prepolymer catalyst obtained in the above-described manner were added. The temperature was then raised to 70° C. and kept there for 10 minutes to carry out polymerization.

Next, the vent valve was opened and the unreacted propylene was purged via an integrating flowmeter (end of first stage propylene homopolymerization).

After the end of purging, the vent valve was closed, 3 kg of propylene and 0.7 liter of hydrogen were introduced, and the temperature was raised to 70° C. and kept there for 5 minutes to carry out polymerization. The vent valve was then opened and the unreacted propylene was purged via an integrating flowmeter (end of second stage propylene homopolymerization).

After the end of purging, the vent valve was closed, 3 kg of propylene and 8.5 liter of hydrogen were introduced, and the temperature was raised to 70° C. and kept there for 60 minutes to carry out polymerization. After then adding a small amount of ethanol to stop the polymerization reaction, the unreacted gas in the reactor was purged via an integrating flowmeter (end of third stage propylene homopolymerization).

2780 g of polypropylene were obtained by the above procedure.

This polypropylene had an intrinsic viscosity (1) of 2.1 dl/g and a bulk specific gravity of 0.48 g/ml. The atio of the polymer quantities at the respective stages as calculated from the integrating flowmeter was first stage ($x_1$)/second stage ($x_2$)/third stage ($x_3$)=6/6/88. The intrinsic viscosities ($\eta_{1st}$), ($\eta_{2nd}$), and ($\eta_{3rd}$) of the polymers obtained in the respective stages are shown in Table 1. These intrinsic viscosities of the respective stages were determined as follows.

The intrinsic viscosity ($\eta_{1st}$) of the polymer obtained in the first stage was measured by sampling a portion of the polymer after completion of the first stage.

The intrinsic viscosity ($\eta_{2nd}$) of the polymer obtained in the second stage and the intrinsic viscosity ($\eta_{3rd}$) of the polymer obtained in the third stage were determined using equations (1) and (2) indicated below.

$$(\eta_{2,\ Total}) = x_1/(x_1+x_2)(\eta_{1st}) + x_2/(x_1+x_2)(\eta_{2nd}) \quad (1)$$

$$(\eta_{Total}) = x_1/(x_1+x_2+x_3)(\eta_{1st}) + x_2/(x_1+x_2+x_3)(\eta_{2nd}) + x_3/(x_1+i_2+x_3)(\eta_{3rd}) \quad (2)$$

In the above, $x_1$, $x_2$, and $x_3$ are the polymer quantity ratios of the respective stages, ($\eta_{2,\ Total}$) is the value measured upon sampling a portion of the polymer after the completion of the second stage, and ($\eta_{Total}$) is the value measured upon sampling a portion of the polymer after the completion of the third stage.

(Pelletization)

Pelletizing of the homopolypropylene was performed by blending 0.1 parts by weight of 3,5-di-t-butyl-4-hydroxytoluene, 0.1 parts by weight of tetrakis[methylene-3(3,5-di-t-butyl-4-hydroxyphenyl)propionate]methane, 0.1 parts by weight of calcium stearate, and 0.2 parts by weight of sodium-2,2'-methylene-bis(4,6-di-t-butylphenyl)phosphate with 100 weight parts of the polypropylene (PP-1) obtained as described above and melt kneading at a resin temperature of 230° C. with a double-axis extruder (made by Haake Co.).

The IS55 injection molder manufactured by Toshiba Machinery Co. Ltd. was then used to prepare a test piece under predetermined conditions from the sample thus obtained. The test results are shown in Table 2.

Example 2

Production of Homopolypropylene (PP-2)

3 kg of propylene were placed in an autoclave with an inner volume of 17 liter and after raising the temperature to 60° C., 7.0 millimoles of triethylaluminum, 7.0 millimoles of dicyclopentyldimethoxysilane, and 2.28 g of the prepolymer catalyst obtained in Example 1 were added. The temperature was kept at 60° C. for 14 minutes to carry out polymerization.

Next, the vent valve was opened and the unreacted propylene was purged via an integrating flowmeter (end of first stage propylene homopolymerization).

After the end of purging, the vent valve was closed, 3 kg of propylene and 0.6 liter of hydrogen were introduced, and the temperature was raised to 70° C. and kept there for 6 minutes to carry out polymerization. The vent valve was then opened and the unreacted propylene was purged via an integrating flowmeter (end of second stage propylene homopolymerization).

After the end of purging, the vent valve was closed, 3 kg of propylene and 23 liter of hydrogen were introduced, and the temperature was raised to 70° C. and kept there for 65 minutes to carry out polymerization. After then adding a small amount of ethanol to stop the polymerization reaction, the unreacted gas in the reactor was purged via an integrating flowmeter (end of third stage propylene homopolymerization). 2814 g of polypropylene were obtained by the above procedure.

This polypropylene had an intrinsic viscosity ($\eta$) of 2.0 dl/g and a bulk specific gravity of 0.48 g/ml. The ratio of the polymer quantities at the respective stages as calculated from the integrating flowmeter was first stage ($x_1$)/second stage ($x_2$)/third stage ($x_3$)=8/8/84. The intrinsic viscosities ($\eta_{1st}$), ($\eta_{2nd}$), and ($\eta_{3rd}$) of the polymers obtained in the respective stages are shown in Table 1.

(Pelletization)

Example 1 was repeated except for using the homopolypropylene (PP-2) obtained in the above manner in place of PP-1, to perform pelletization.

An injection molded test piece was prepared in the same manner as in Example 1. The results are shown in Table 2.

Example 3

Production of Homopolypropylene (PP-3)

3 kg of propylene were placed in an autoclave with an inner volume of 17 liter and after raising the temperature to 60° C., 7.0 millimoles of triethylaluminum, 7.0 millimoles of di-t-butyldimethoxysilane (DTBMS), and 2.28 g of the prepolymer catalyst obtained in Example 1 were added. The temperature was then raised to 70° C. and kept there for 9 minutes to carry out polymerization.

Next, the vent valve was opened and the unreacted propylene was purged via an integrating flowmeter (end of first stage propylene homopolymerization).

After the end of purging, the vent valve was closed, 3 kg of propylene and 0.7 liter of hydrogen were introduced, and the temperature was raised to 70° C. and kept there for 5 minutes to carry out polymerization. The vent valve was then opened and the unreacted propylene was purged via an integrating flowmeter (end of second stage propylene homopolymerization).

After the end of purging, the vent valve was closed, 3 kg of propylene and 56 liter of hydrogen were introduced, and the temperature was raised to 70° C. and kept there for 70 minutes to carry out polymerization. After then adding a small amount of ethanol to stop the polymerization reaction, the unreacted gas in the reactor was purged via an integrating flowmeter (end of third stage propylene homopolymerization).

2697 g of polypropylene were obtained by the above procedure.

This polypropylene had an intrinsic viscosity ($\eta$) of 2.2 dl/g and a bulk specific gravity of 0.47 g/ml. The ratio of the polymer quantities at the respective stages as calculated from the integrating flowmeter was first stage ($x_1$)/second stage ($x_2$)/third stage ($x_3$)=8/8/84. The intrinsic viscosities ($\eta_{1st}$), ($\eta_{2nd}$) and ($\eta_{3rd}$) of the polymers obtained in the respective stages are shown in Table 1.

(Pelletization)

Example 1 was repeated except for using the homopolypropylene (PP-3) obtained in the above manner in place of PP-1, to perform pelletization.

An injection molded test piece was prepared in the same manner as in Example 1. The results are shown in Table 2.

Comparative Example 11

Production of Homopolypropylene (PPc1)

3 kg of propylene and 6.5 liter of hydrogen were placed in an autoclave with an inner volume of 17 liter and after raising the temperature to 60° C., 7.0 millimoles of triethylaluminum, 7.0 millimoles of dicyclopentyldimethoxysilane, and 2.28 g of the prepolymer catalyst obtained in Example 1 were added.

The temperature was then raised to 70° C. and kept there for 55 minutes to carry out polymerization.

After then adding a small amount of ethanol to stop the polymerization reaction, the unreacted gas in the reactor was purged via an integrating flowmeter.

2755 g of polypropylene were obtained by the above procedure.

This polypropylene had an intrinsic viscosity (η) of 1.7 dl/g and a bulk specific gravity of 0.48 g/ml.
(Pelletization)

Example 1 was repeated except for using the homopolypropylene (PPc-1) obtained in the above manner in place of PP-1, to perform pelletization.

An injection molded test piece was prepared in the same manner as in Example 1. The results are shown in Table 2.

Example 4

Production of Propylene Block Copolymer (PP-4)

First stage propylene homopolymerization, second stage propylene homopolymerization, and third stage propylene homopolymerization were carried out in the same manner as in Example 2, and the unreacted gas after the end of the third stage propylene homopolymerization was purged without adding ethanol.

Ethylene, propylene, and hydrogen were then supplied to the polymerizer at rates of 800 liter/hour, 1200 liter/hour and 30 liter/hour, respectively, the vent opening of the polymerizer was adjusted to keep the pressure inside the polymerizer at 10 kg/cm$^2$-G, and polymerization was carried out for 60 minutes at 70° C.

After then adding a small amount of ethanol to stop the polymerization reaction, the unreacted gas in the polymerizer was purged.

3141 g of polypropylene were obtained in the above manner.

The quantity of polymer in the rubber component comprised 11 wt. % of the polypropylene, the intrinsic viscosity (η) was 3.0 dl/g, and the ethylene content was 40mol %.
(Pelletization)

Example 1 was repeated except for using the propylene block copolymer (PP-4) obtained in the above manner in place of PP-1, to perform pelletization.

An injection molded test piece was prepared in the same manner as in Example 1. The results are shown in Table 2.

Comparison Example 2

Production of Propylene Block Polymer (PPc2)

After performing homopolymerization of propylene in the same manner as in Comparative Example 1, the unreacted gas was purged without adding ethanol. Ethylene, propylene, and hydrogen were then supplied to the polymerizer at rates of 800 liter/hour, 1200 liter/hour and 30 liter/hour, respectively, the vent opening of the polymerizer was adjusted so that the pressure inside the polymerizer was 10 kg/cm$^2$-G, and polymerization was carried out for 60 minutes at 70° C.

After then adding a small amount of ethanol to stop the polymerization reaction, the unreacted gas in the polymerizer was purged.

3132 g of polypropylene were obtained in the above manner.

The quantity of polymer in the rubber component comprised 10 wt. % of the polypropylene, the intrinsic viscosity (η) was 3.0 dl/g, and the ethylene content was 40mol %.

(Pelletization)

Example 1 was repeated except for using the propylene block copolymer (PPc-2) obtained in the above manner in place of PP-1, to perform pelletization.

An injection molded test piece was prepared in the same manner as in Example 1. The results are shown in Table 2.

TABLE 1

|  |  | Ex. 1 PP-1 | Ex. 2 PP-2 | Ex. 3 PP-3 | Comp. Ex. 1 PPc1 | Ex. 4 PP-4 | Comp. Ex. 2 PPc2 |
|---|---|---|---|---|---|---|---|
| Propylene polymerization |  |  |  |  |  |  |  |
| First stage | (η 1st )(dl/g) | 8.8 | 9.5 | 12 | 1.7 | 9.5 | 1.7 |
|  | Polymer ratio (wt. %) | 6 | 8 | 8 | 100 | 5 | 90 |
| Second stage | (η 2nd)(dl/g) | 4.3 | 4.5 | 6.5 | — | 4.5 | — |
|  | Polymer ratio (wt. %) | 6 | 8 | 8 | — | 5 | — |
| Third stage | (η 3rd)(dl/g) | 1.5 | 1.0 | 1.0 | — | 1.0 | — |
|  | Polymer ratio (wt. %) | 88 | 84 | 84 | — | 79 | — |
| Rubber component |  |  |  |  |  |  |  |
|  | (η) (dl/g) |  |  |  |  | 3.0 | 3.0 |
|  | Ethylene content (mol %) |  |  |  |  | 40 | 40 |
|  | Polymer ratio (wt. %) |  |  |  |  | 11 | 10 |

TABLE 2

|  |  | Components insoluble in 64° C. decane |  |  |  |  | Total polypropylene |  |  |
|---|---|---|---|---|---|---|---|---|---|
|  | Propylene No. | Quantity (wt. %) | (η) (dl/g) | Mz/Mw | mmmm percentage (%) | D value | FM (MPa) | MT (g) | Pencil hardness |
| Ex. 1 | PP-1 | 99.4 | 2.1 | 6.1 | 99.0 | 6.1 | 2432 | 2.5 | HB |
| Ex. 2 | PP-2 | 99.6 | 2.0 | 8.0 | 98.7 | 6.3 | 2551 | 4.0 | F |
| Ex. 3 | PP-3 | 99.5 | 2.2 | 9.3 | 98.4 | 7.5 | 2700 | 7.0 | F |
| Comp. Ex. 1 | PPc1 | 99.5 | 1.7 | 3.5 | 98.5 | 2.1 | 2121 | 0.6 | B |
| Ex. 4 | PP-4 | 89.5 | 2.0 | 7.9 | 98.2 | 6.4 | 2150 | 3.8 | 2B |
| Comp. Ex. 2 | PPc2 | 89.4 | 2.1 | 3.2 | 98.2 | 2.2 | 1844 | 0.5 | 3B |

Production examples of the polypropylene used in the embodiments and comparison examples described below shall now be described.

Preparation Example 1

Production of Homopolypropylene (PP-5)
(Polymerization)

135.9 kg of propylene were placed in a polymerizer with an inner volume of 1 m$^3$ and after raising the temperature to 30° C., 250 millimoles of triethylaluminum, 250 millimoles of dicyclopentyldimethoxysilane, and 5 millimoles of the solid titanium catalyst component (a) obtained in Example 1 were added. The temperature was then maintained at 30° C. and the pressure was kept at 5.7 kg/cm$^2$G for 45 minutes to carry out polymerization.

Next, the vent valve was opened and the unreacted propylene was purged via an integrating flowmeter (end of first stage propylene homopolymerization).

After the end of purging, the vent valve was closed, 125 kg of propylene and 200N liter of hydrogen were introduced, and the temperature was raised to 70° C. and kept there for 2 hours and 23 minutes to carry out polymerization. The vent valve was then opened and the unreacted propylene was purged via an integrating flowmeter (end of second stage propylene homopolymerization).

91.2 kg of polypropylene were obtained by the above procedure.

This polypropylene had an intrinsic viscosity ($\eta$) of 2.9 dl/g and a bulk specific gravity of 0.47 g/ml. The ratio of the polymer quantities at the respective stages as calculated from the integrating flowmeter was first stage ($x_1$)/second stage ($x_2$)=5/95.

The intrinsic viscosities ($\eta_{1st}$) and ($\eta_{2nd}$) of the polymers obtained in the respective stages and the ($\eta$) (($\eta_{Total}$)) of polypropylene (PP-5) are shown in Table 3.

These intrinsic viscosities of the respective stages were determined as follows.

The limiting viscosity ($\eta_{1st}$) of the polymer obtained in the first stage was measured by sampling a portion of the polymer after completion of the first stage.

The limiting viscosity ($\eta_{2nd}$) of the polymer obtained in the second stage was determined using equation (1) indicated below.

$$(\eta_{Total})=x_1/(x_1+x_2)(\eta_{1st})+x_2/(x_1+x_2)(\eta_{2nd}) \quad (1)$$

Preparation Example 2

Production of Homopolypropylene (PP-6)

153.8 kg of propylene were placed in a polymerizer with an inner volume of 1 m$^3$ and after raising the temperature to 30° C., 250 millimoles of triethylaluminum, 250 millimoles of dicyclopentyldimethoxysilane, and 5 millimoles of the solid titanium catalyst component (a) obtained in Example 1 were added. The temperature was then kept at 30° C. and the pressure was kept at 5.7 kg/cm$^2$G for 50 minutes to carry out polymerization.

Next, the vent valve was opened and the unreacted propylene was purged via an integrating flowmeter (end of first stage propylene homopolymerization).

After the end of purging, the vent valve was closed, 135 kg of propylene and 1580N liter of hydrogen were introduced, and the temperature was raised to 70° C. and kept there for 4 hours and 35 minutes to carry out polymerization. The vent valve was then opened and the unreacted propylene was purged via an integrating flowmeter (end of second stage propylene homopolymerization).

This polypropylene had an intrinsic ($\eta$) of 1.5 dl/g and a bulk specific gravity of 0.47 g/ml. The ratio of the polymer quantities at the respective stages as calculated from the integrating flowmeter was first stage ($x_1$)/second stage ($x_2$)=5/95.

The intrinsic viscosities ($\eta_{1st}$) and ($\eta_{2nd}$) of the polymers obtained in the respective stages and the ($\eta$) (($\eta_{Total}$)) of polypropylene (PP-6) are shown in Table 3.

Preparation Example 3

Production of Homopolypropylene (PP-7)

150.2 kg of propylene were placed in a polymerizer with an inner volume of 1 m$^3$ and after raising the temperature to 30° C., 250 millimoles of triethylaluminum, 250 millimoles of dicyclopentyldimethoxysilane, and 5 millimoles of the solid titanium catalyst component (a) obtained in Example 1 were added. The temperature was then maintained at 30° C. and the pressure was kept at 5.7 kg/cm$^2$G for 2 hours and 15 minutes to carry out polymerization.

Next, the vent valve was opened and the unreacted propylene was purged via an integrating flowmeter (end of first stage propylene homopolymerization).

After the end of purging, the vent valve was closed, 130 kg of propylene and 650N liter of hydrogen were added, and the temperature was raised to 70° C. and kept there for 4 hours to carry out polymerization. The vent valve was then opened and the unreacted propylene was purged via an integrating flowmeter (end of second stage propylene homopolymerization).

84 kg of polypropylene were obtained by the above procedure.

This polypropylene had an intrinsic viscosity ($\eta$) of 2.7 dl/g and a bulk specific gravity of 0.47 g/ml. The ratio of the polymer quantities at the respective stages as calculated from the integrating flowmeter was first stage ($x_1$)/second stage ($x_2$)=12/88.

The limiting viscosities ($\eta_{1st}$) and ($\eta_{2nd}$) of the polymers obtained in the respective stages and the ($\eta$) of polypropylene (PP-7) are shown in Table 3.

Preparation Example 4

Production of Homopolypropylene (PP-8)
(Polymerization)

148.7 kg of propylene were placed in a polymerizer with an inner volume of 1 m$^3$ and after raising the temperature to 30° C., 250 millimoles of triethylaluminum, 250 millimoles of dicyclopentyldimethoxysilane, and 5 millimoles of the solid titanium catalyst component (a) obtained in Example 1 were added. The temperature was then maintained at 30° C. and the pressure was kept at 5.7 kg/cm$^2$G for 52 minutes to carry out polymerization.

Next, the vent valve was opened and the unreacted propylene was purged via an integrating flowmeter (end of first stage propylene homopolymerization).

After the end of purging, the vent valve was closed, 135 kg of propylene and 2800N liter of hydrogen were added, and the temperature was raised to 70° C. and kept there for 6 hours and 30 minutes to carry out polymerization. The vent valve was then opened and the unreacted propylene was purged via an integrating flowmeter (end of second stage propylene homopolymerization).

121 kg of polypropylene were obtained by the above procedure.

This polypropylene had an intrinsic viscosity ($\eta$) of 1.2 dl/g and a bulk specific gravity of 0.47 g/ml. The ratio of the polymer quantities at the respective stages as calculated from the integrating flowmeter was first stage ($x_1$)/second stage ($x_2$)=5/95.

The limiting viscosities ($\eta_{1st}$) and ($\eta_{2nd}$) of the polymers obtained in the respective stages and the ($\eta$) of polypropylene (PP-8) are shown in Table 3.

Preparation Example 5

Production of Polypropylene (PP-9)

The temperature of a slurry solution (100 g/liter) of the propylene (PP-8) powder, obtained in the manner described above, in decane was kept at 124° C. and stirred for 2 hours. Thereafter, the slurry solution was filtered, and the filter mass was dried to obtain polypropylene (PP-9).

The intrinsic viscosity ($\eta$) of this polypropylene was 1.4 g/dl.

Preparation Example 6

Production of Polypropylene (PP-10)

The temperature of a slurry solution (10 g/liter) of the propylene (PP-8) powder, obtained in the manner described above, in decane was kept at 120° C. and stirred for 2 hours. Thereafter, the slurry solution was filtered, and the filter mass was dried to obtain polypropylene (PP-10).

The intrinsic viscosity ($\eta$) of this polypropylene was 1.3 g/dl.

Comparative Preparation Example 1

Production of Homopolypropylene (PPc3)

135 kg of propylene and 200N liter of hydrogen were placed in a polymerizer with an inner volume of 1 m³ and after raising the temperature to 70° C., 250 millimoles of triethylaluminum, 250 millimoles of dicyclopentyldimethoxysilane, and 5 millimoles of the solid titanium catalyst component (a) obtained in Example 1 were added. The temperature was then maintained at 70° C. and the pressure was kept at 5.7 kg/cm²G for 4 hours to carry out polymerization. The vent valve was then opened and the unreacted propylene was purged via an integrating flowmeter.

71 kg of polypropylene were obtained by the above procedure.

This polypropylene had an intrinsic viscosity ($\eta$) of 2.7 dl/g and a bulk specific gravity of 0.47 g/ml.

Comparative Preparation Example 2

Production of Homopolypropylene (PPc4)

135 kg of propylene and 1350N liter of hydrogen were placed in a polymerizer with an inner volume of 1 m³ and after raising the temperature to 70° C., 250 millimoles of triethylaluminum, 250 millimoles of dicyclopentyldimethoxysilane, and 5 millimoles of the solid titanium catalyst component (a) obtained in Example 1 were added. The temperature was then maintained at 70° C. and the pressure was kept at 5.7 kg/cm²G for 4 hours to carry out polymerization. The vent valve was then opened and the unreacted propylene was purged via an integrating flowmeter.

78 kg of polypropylene were obtained by the above procedure.

This polypropylene had an intrinsic viscosity ($\eta$) of 1.3 dl/g and a bulk specific gravity of 0.47 g/ml.

Comparative Preparation Example 3

Production of Homopolypropylene (PPc5)

135 kg of propylene and 690N liter of hydrogen were placed in a polymerizer with an inner volume of 1 m³ and after raising the temperature to 70° C., 250 millimoles of triethylaluminum, 250 millimoles of dicyclopentyldimethoxysilane, and 5 millimoles of the solid titanium catalyst component (a) obtained in Example 1 were added. The temperature was then maintained at 70° C. and the pressure was kept at 5.7 kg/cm²G for 4 hours to carry out polymerization.

The vent valve was then opened and the unreacted propylene was purged via an integrating flowmeter (end of first stage propylene homopolymerization).

After the end of purging, the vent valve was closed, 130 kg of propylene and 1950N liter of hydrogen were introduced, and the temperature was raised to 70° C. and kept there for 3 hours to carry out polymerization. The vent valve was then opened and the unreacted propylene was purged via an integrating flowmeter (end of second stage propylene homopolymerization).

88 kg of polypropylene were obtained by the above procedure.

This polypropylene had an intrinsic viscosity ($\eta$) of 1.3 dl/g and a bulk specific gravity of 0.47 g/ml. The ratio of the polymer quantities at the respective stages as calculated from the integrating flowmeter was first stage ($x_1$)/second stage ($x_2$)=40/60.

The intrinsic viscosities ($\eta_{1st}$) and ($\eta_{2nd}$) of the polymers obtained in the respective stages and the ($\eta$) of polypropylene (PPc5) are shown in Table 3.

Comparative Preparation Example 4

Production of Homopolypropylene (PPc6)

135 kg of propylene and 68N liter of hydrogen were placed in a polymerizer with an inner volume of 1 m³ and after raising the temperature to 70° C., 250 millimoles of triethylaluminum, 250 millimoles of dicyclopentyldimethoxysilane, and 5 millimoles of the solid titanium catalyst component (a) obtained in Example 1 were added. The temperature was then maintained at 70° C. and the pressure was kept at 5.7 kg/cm²G for 4 hours to carry out polymerization.

The vent valve was then opened and the unreacted propylene was purged via an integrating flowmeter (end of first stage propylene homopolymerization).

After the end of purging, the vent valve was closed, 130 kg of propylene and 850N liter of hydrogen were introduced, and the temperature was raised to 70° C. and kept there for 3 hours to carry out polymerization. The vent valve was then opened and the unreacted propylene was purged via an integrating flowmeter (end of second stage propylene homopolymerization).

89 kg of polypropylene were obtained by the above procedure.

This polypropylene had an intrinsic viscosity ($\eta$) of 2.6 dl/g and a bulk specific gravity of 0.47 g/ml. The ratio of the polymer quantities at the respective stages as calculated from the integrating flowmeter was first stage ($x_1$)/second stage ($x_2$)=40/60.

The limiting viscosities ($\eta_{1st}$) and ($\eta_{2nd}$) of the polymers obtained in the respective stages and the ($\eta$) of polypropylene (PPc6) are shown in Table 3.

Comparative Preparation Example 5

Production of Homopolypropylene (PPc7)

135 kg of propylene and 1500N liter of hydrogen were placed in a polymerizer with an inner volume of 1 m³ and after raising the temperature to 70° C., 250 millimoles of triethylaluminum, 250 millimoles of dicyclopentyldimethoxysilane, and 5 millimoles of the solid titanium catalyst component (a) obtained in Example 1 were added. The temperature was then maintained at 70° C. and the pressure was kept at 5.7 kg/cm²G for 4 hours to carry out polymerization. The vent valve was then opened and the unreacted propylene was purged via an integrating flowmeter.

82 kg of polypropylene were obtained by the above procedure.

This polypropylene had an intrinsic viscosity (η) of 1.2 dl/g and a bulk specific gravity of 0.47 g/ml.

Reference Preparation Example

Production of Homopolypropylene (PP-11)

150.2 kg of propylene were placed in a polymerizer with an inner volume of 1 m³ and after raising the temperature to 30° C., 250 millimoles of triethylaluminum, 250 millimoles of dicyclopentyldimethoxysilane, and 5 millimoles of the solid titanium catalyst component (a) obtained in Example 1 were added. The temperature was then maintained at 30° C. and the pressure was kept at 5.7 kg/cm²G for 2 hours and 15 minutes to carry out polymerization.

Next, the vent valve was opened and the unreacted propylene was purged via an integrating flowmeter (end of first stage propylene homopolymerization).

After the end of purging, the vent valve was closed, 130 kg of propylene and 1950N liter of hydrogen were added, and the temperature was raised to 70° C. and kept there for 4 hours to carry out polymerization. The vent valve was then opened and the unreacted propylene was purged via an integrating flowmeter (end of second stage propylene homopolymerization).

90 kg of polypropylene were obtained by the above procedure.

This polypropylene had an intrinsic viscosity (η) of 2.2 dl/g and a bulk specific gravity of 0.47 g/ml. The ratio of the polymer quantities at the respective stages as calculated from the integrating flowmeter was first stage ($x_1$)/second stage ($x_2$)=15/85.

The intrinsic viscosities ($\eta_{1st}$) and ($\eta_{2nd}$) of the polymers obtained in the respective stages and the (η) of polypropylene (PP-11) are shown in Table 3.

TABLE 3

| Polypropylane rot | | Polypropylenes prepared in Preparation Examples 1 to 6 | | | | | | Polypropylenes prepared in Compar. Prep. Ex. 1 to 5 | | | | | Reference Prep. Example |
|---|---|---|---|---|---|---|---|---|---|---|---|---|---|
| No. | | PP-5 | PP-6 | PP-7 | PP-8 | PP-9 | PP-10 | PPc3 | PPc4 | PPc5 | PPc6 | PPc7 | PP-11 |
| First stage | ($\eta_{1st}$) (dl/g) | 9.4 | 9.5 | 8.2 | 9.5 | | | 2.7 | 1.3 | 2.0 | 4.0 | 1.2 | 9.5 |
| | Polymer ratio (wt. %) | 5 | 5 | 12 | 5 | | | 100 | 100 | 40 | 40 | 100 | 15 |
| Second stage | ($\eta_{2nd}$) (dl/g) | 2.6 | 1.1 | 2.0 | 0.8 | | | — | — | 0.8 | 1.8 | — | 0.9 |
| | Polymer ratio (wt. %) | 95 | 95 | 88 | 95 | | | — | — | 60 | 60 | — | 85 |
| (η) after polymerization (dl/g) | | 2.9 | 1.5 | 2.9 | 1.2 | 1.2 | | 2.7 | 1.3 | 1.3 | 2.6 | 1.2 | 2.2 |
| (η) after hot filtration (dl/g) | | | — | | 1.4*¹ | 1.3*² | | | | — | | | |
| MFR (g/10 min.) | | 1.9 | 50 | 2.8 | 260 | 50 | 80 | 1.9 | 52 | 59 | 2.7 | 80 | 45 |

*¹components insoluble in 124 flC decane of PP-8
*²components insoluble in 120 flC decane of PP-8

The evaluation methods, besides those described above, which were used to evaluate the polypropylene or polypropylene composition in Examples and Comparative Examples are described below.

(Quantity of Components Insoluble in 64° C. Decane)

In the description of Examples and Comparative Examples that follow, the quantity of components insoluble in 64° C. decane* (wt. %)indicated in the Tables is that of the components insoluble in 64° C. decane that are contained in the components soluble in 140° C. decane.

(wt. %)=(Quantity of components insoluble in 64° C. decane (weight))/(Quantity of components soluble in 140° C. decane)×100

(Melt Flow Rate (MFR))

The melt flow rate was measured at 230° C. and under a load of 2.16 kg in compliance with ASTM D1238.

(Flexure Modulus (FM))

Using a test piece that was injection molded under predetermined conditions, the flexure modulus was measured at a test temperature of 23° C., span interval of 51 mm, and flexing rate of 20 mm/minute in compliance with ASTM D790.

(Izod Impact Strength (IZ))

The Izod impact strength was measured in compliance with ASTM D790.

(Tensile Elongation)

The tensile elongation was measured in compliance with ASTM D638.

(SR (Die Swell Ratio))

A sample was extruded at 230° C. and γ=2600sec⁻¹ using a capillary rheometer (barrel diameter: 10 mm, nozzle diameter (D): 1 mm, nozzle length (L): 30 mm). The diameter of the extruded strand was measured and this diameter was divided by the nozzle diameter (D) to obtain the SR.

(Surface Hardness)

The surface hardness was measured in compliance with ASTM D685 (R scale).

(Embrittlement Temperature)

The embrittlement temperature was measured in compliance with ASTM D746.

(External Appearance)

100 parts by weight of polypropylene composition was blended with two parts by weight of a carbon master batch (PPM01143 Black supplied from by Toyo Ink Co., Ltd.) and this was used to form an injection molded rectangular plate (length 350 mm×width 10 mm×thickness 3 mm). The gate was a side gate and was located 35 mm from an end in the length direction. The external appearance was judged visually under the following standards.

AA: No flow marks are seen within 300 mm in the length direction from the gate position.

BB: No flow marks are seen within 280 mm in the length direction from the gate position.

CC: A flow mark is seen within 280 mm in the length direction from the gate position.

Here, a flow mark refers to vertical, stripe-like patterns that occur in the injection path.

Examples 5 to 7

Each of the polypropylenes (PP-5 to PP-7) obtained in Preparation Examples was pelletized by blending 100 parts by weight of the polypropylene with 0.1 parts by weight of 3,5-di-t-butyl-4-hydroxytoluene, 0.1 parts by weight of tetrakis(methylene-3(3,5-di-t-butyl-4-hydroxyphenyl)propionate]methane, and 0.1 parts by weight of calcium stearate, and melt kneading at a resin temperature of 230° C. with a double-axis extruder (made by Haake Co.).

The results are shown in Table 4.

Example 8

Polypropylene powders obtained in Preparation Examples 5 and 6 described above were dry-blended at a weight ratio of (PP-5)/(PP-6)=63/37 to prepare a polypropylene mixture.

This mixture was pelletized in the same manner as in Example 5. The results are shown in Table 4.

Example 9

The polypropylene mixture obtained in Preparation Examples 8 was pelletized by blending 100 parts by weight of the polypropylene mixture with 0.1 parts by weight of 3,5-di-t-butyl-4-hydroxytoluene, 0.1 parts by weight of tetrakis[methylene-3(3,5-di-t-butyl-4-hydroxyphenyl)propionate]methane, 0.1 parts by weight of calcium stearate, and 0.2 parts by weight of sodium-2,2'-methylene-bis(4,6-di-t-butylphenyl)phosphate and melt kneading at a resin temperature of 230° C. with a double-axis extruder (made by Haake Co.).

The results are shown in Table 4.

TABLE 4

|  | Ex. 5 | Ex. 6 | Ex. 7 | Ex. 8 | Ex. 9 |
| --- | --- | --- | --- | --- | --- |
| Polypropylene rot No. | PP-5 | PP-6 | PP-7 | PP-5/PP-6 63/37 | |
| Quantity of components soluble in 140° C. decane (wt. %) | 99.1 | 99.3 | 99.2 | 98.9 | 98.5 |
| Quantity of components insoluble in 64° C. decane (wt. %) | 98.4 | 98.6 | 98.7 | 98.4 | 98.5 |
| (1) ($\eta$) (dl/g) | 2.9 | 1.5 | 2.7 | 2.0 | 2.0 |
| Mn ($\times 10^{-4}$) | 6.59 | 2.55 | 7.32 | 3.3 | 3.2 |
| Mw ($\times 10^{-5}$) | 4.71 | 2.23 | 4.8 | 3.15 | 3.13 |
| Mz ($\times 10^{-6}$) | 2.85 | 4.07 | 2.65 | 3.39 | 3.35 |
| Mw/Mn | 7.1 | 8.8 | 6.6 | 9.5 | 9.8 |
| (2) Mz/Mw | 6.1 | 18.2 | 5.5 | 10.8 | 10.7 |
| (3) mmmm percentage (%) | 98.6 | 98.5 | 98.4 | 98.5 | 98.4 |
| (4) D value | 4.08 | 9.06 | 4.71 | 4.83 | 4.82 |
| MFR (g/10 minutes) | 1.9 | 50 | 2.8 | 15.3 | 15.1 |
| Flexure modulus (MPa) | 2050 | 2200 | 2020 | 2110 | 2540 |
| IZ impact strength (23° C.) (J/M) | 35 | 21 | 34 | 22 | 21 |
| Tensile elongation (%) | 350 | 110 | 370 | 120 | 40 |
| Melt tension: MT 230° C. (g) | 2.3 | 0.3 | 2.2 | 0.75 | 0.6 |
| SR ($\gamma$ = 2600, 230° C.) | 1.91 | 2.23 | 2.04 | 2.05 | 2.03 |

*Quantity of components insoluble in 64° C. decane (wt. %) = (Quantity of components insoluble in 64° C. decane (weight))/(Quantity of components insoluble in 140° C. decane) × 100

Comparative Examples 3 to 6

Example 5 was repeated except for using the polypropylenes PPc3 to PP-c6 obtained in Comparative preparation Examples 1 to 4 in place of polypropylene PP-5, pelletizing was performed in the same manner as in Example 5. The results are shown in Table 5.

Comparative Example 7

Polypropylene powders obtained in Comparative preparation Example 4 and Reerance preparation Example were dry-blended at a weight ratio of (PPc6)/(PP-11)=59/41 to prepare a polypropylene mixture.

Examples 5 was repeated except for using this polypropylene mixture in place of polypropylene PP-5, pelletizing was performed in the same manner as in Example 5. The results are shown in Table 5.

Comparative Example 8

The polypropylene mixture obtained in Comparative Example 7 was pelletized in the same manner as in Example 9. The results are shown in Table 5.

Referential Example 1

Example 5 was repeated except for using the polypropylene PP-11 obtained in the reference production example in place of polypropylene PP-5, pelletizing was performed in the same manner as in Example 5. The results are shown in Table 5.

TABLE 5

|  | Comp. Ex. 3 | Comp. Ex. 4 | Comp. Ex. 5 | Comp. Ex. 6 | Comp. Ex. 7 | Comp. Ex. 8 | Ref. Ex.1 |
|---|---|---|---|---|---|---|---|
| Polypropylene rot No. | PPc3 | PPc4 | PPc5 | PPc6 | PPc6/PP-11 59/41 | | PP-11 |
| Quantity of components soluble in 140° C. decane (wt. %) | 99 | 99.2 | 98.8 | 98.9 | 98.6 | 98.2 | 98.5 |
| Quantity of components insoluble in 64° C. decane (wt. %) | 98.5 | 98.4 | 98.9 | 99.1 | 98.7 | 99.2 | 99.1 |
| (1) ($\eta$) (dl/g) | 2.7 | 1.3 | 1.3 | 2.6 | 1.9 | 1.9 | 2.2 |
| Mn ($\times 10^{-4}$) | 10 | 3.1 | 2.49 | 7.36 | 3.42 | 3.43 | 2.1 |
| Mw ($\times 10^{-5}$) | 4.49 | 1.7 | 1.63 | 4.42 | 2.77 | 2.78 | 3.87 |
| Mz ($\times 10^{-6}$) | 1.7 | 0.61 | 0.66 | 1.84 | 1.43 | 1.45 | 4.57 |
| (2) Mw/Mn | 4.5 | 5.5 | 6.5 | 6 | | | |
| Mz/Mw | 3.8 | 3.6 | 4.1 | 4.2 | 5.2 | 5.2 | 11.8 |
| (3) mmmm percentage (%) | 98.6 | 98.6 | 98.9 | 98.5 | 98.5 | 98.3 | 98.3 |
| (4) D value | 3.27 | <2.6 | 2.68 | 3.68 | 3.39 | 3.38 | 7.64 |
| MFR (g/10 minutes) | 1.9 | 52 | 59 | 2.7 | 15.6 | 15.2 | 45 |
| Flexure modulus: FM (MPa) | 1807 | 1679 | 1860 | 1880 | 1910 | 2470 | 2240 |
| IZ impact strength (23° C.) (J/M) | 46 | 21 | 34 | 22 | 19 | 20 | 21 |
| Tensile elongation (%) | 330 | 370 | 90 | 380 | 310 | 240 | 10 |
| Melt tension: MT 230° C. (g) | 2 | Could not be measured. | 0.1 | 1.9 | 0.4 | 0.41 | 1.35 |
| SR ($\gamma$ = 2600, 230° C.) | 1.76 | 1.61 | 1.71 | 1.88 | 1.85 | 1.87 | 3.03 |

In Examples 10 to 24 and Comparative Examples 9 to 16 described below, the following rubber components and inorganic fillers were used.
(Styrene Copolymer)
S-1: Hydrogenated styrene block copolymer
  MFR=7.1 g/10 minutes
  Styrene block unit content: 13.2 wt. %
  (Kraton G1657; made by Shell Co.)
S-2: Hydrogenated styrene block copolymer
  MFR=1.1 g/10 minutes
  Styrene block unit content: 30.4 wt. %
  (Kraton G1652; made by Shell Co.)
(Ethylene/α-olefin Copolymer)
E-1: Ethylene/1-butene copolymer
  Density=0.861 g/cm$^3$, MFR=1.0 g/10 minutes
  Ethylene unit content=81 mole %
E-2: Ethylene/1-octene copolymer
  Density=0.885 g/cm$^3$, MFR=4.9 g/10 minutes
  1-octene unit content=11 mole %
E-3: Propylene/ethylene copolymer
  Density=0.858 g/cm$^3$, MFR=2.0 g/10 minutes
  Ethylene unit content=41 mole %
E-4: Propylene/ethylene copolymer
  [$\eta$]=2.1 dl/g, ethylene unit content=39.8 mole %
(Inorganic Filler)
A-1: Talc (Miceltone, made by Hayashi Kasei Co.),
  average particle size=1.4 μm Examples 10 to 16

The respective polypropylenes obtained in Preparation Examples described above, the rubber components, and the inorganic filler were dry-blended at the quantities shown in Table 6 to prepare polypropylene mixtures. These polypropylene mixtures were pelletized upon adding the same type of additive as that added in Example 1.

Kneading was performed at 200 to 230° C. using a 30 mmφ extruder.

An injection molder made by Toshiba Machine Co., Ltd. was used to injection mold the obtained compositions at a cylinder temperature of 210° C. and a die temperature of 40° C. The test results are shown in Table 6.

Comparative Example 9

Example 10 was repeated except for using PPc4 obtained in Comparative Preparation Example in place of the polypropylene, a polypropylene composition was prepared in the same manner as in Example 10. The results are shown in Table 6.

Comparative Example 10

Example 15 was repeated except for using PPc4 obtained in Comparative Preparation Example in place of the polypropylene, a polypropylene composition was prepared in the same manner as in Example 10. The results are shown in Table 6.

TABLE 6

| Composition | Ex. 10 Type | Ex. 10 Parts by weight | Ex. 11 Type | Ex. 11 Parts by weight | Comp. Ex. 9 Type | Comp. Ex. 9 Parts by weight | Ex. 12 Type | Ex. 12 Parts by weight | Ex. 13 Type | Ex. 13 Parts by weight |
|---|---|---|---|---|---|---|---|---|---|---|
| Polypropylene | PP-6 | 75 | PP-6 | 75 | PPc4 | 75 | PP-6 | 55 | PP-6 | 55 |
| Styrene copolymer | S-1 | 25 | S-1 | 5 | S-1 | 25 | S-1 | 25 | S-1 | 5 |
| Ethylene/α-olefin copolymer | | | E-2 | 20 | | | | | E-2 | 20 |
| Inorganic filler | | | | | | | A1 | 20 | A1 | 20 |
| Quantity of components soluble in 140° C. decane (wt. %) | | 99.8 | | 99.4 | | 98.9 | | 78.5 | | 79.3 |
| Quantity of components insoluble in 64° C. decane (wt. %) | | 73.6 | | 74.2 | | 73.5 | | 66.4 | | 67.1 |
| (1) (η) (dl/g) | | 1.5 | | 1.5 | | 1.3 | | 1.5 | | 1.5 |
| (2) Mz/Mw | | 18.2 | | 18.1 | | 3.4 | | 17.9 | | 17.9 |
| (3) mmmm percentage (%) | | 98.5 | | 98.5 | | 98.6 | | 98.5 | | 98.5 |
| (4) D value | | 9.0 | | 9.1 | | 2.4 | | 9.1 | | 9.0 |
| MFR (g/10 minutes) | | 31.5 | | 28.7 | | 31.1 | | 26.1 | | 25.0 |
| Flexure modulus (MPa) | | 1460 | | 1440 | | 1405 | | 2200 | | 2150 |
| IZ impact strength (J/M) | | 250 | | 290 | | 200 | | 380 | | 350 |
| Surface hardness (R scale) | | 83 | | 81 | | 85 | | 79 | | 76 |
| Embrittlement temperature (° C.) | | −29 | | −31 | | −25 | | −28 | | −26 |
| External appearance | | AA | | AA | | CC | | AA | | AA |

| Composition | Ex. 14 Type | Ex. 14 Parts by weight | Ex. 15 Type | Ex. 15 Parts by weight | Ex. 16 Type | Ex. 16 Parts by weight | Comp. Ex. 10 Type | Comp. Ex. 10 Parts by weight |
|---|---|---|---|---|---|---|---|---|
| Polypropylene | PP-10 | 55 | PP-10 | 55 | PP-10 | 60 | PPc4 | 55 |
| Styrene copolymer | S-1 | 12 | | | | | | |
| | S-2 | 13 | | | | | | |
| Ethylene/α-olefin copolymer | | | E-2 | 20 | E-1 | 20 | E-2 | 20 |
| | | | E-3 | 5 | E-3 | 10 | E-3 | 5 |
| Inorganic filler | A1 | 20 | A1 | 20 | A1 | 10 | A1 | 20 |
| Quantity of components soluble in 140° C. decane (wt. %) | | 78.5 | | 78.2 | | 86.6 | | 79.2 |
| Quantity of components insoluble in 64° C. decane (wt. %) | | 66.3 | | 66.5 | | 66.7 | | 66.4 |
| (1) (η) (dl/g) | | 1.3 | | 1.3 | | 1.3 | | 1.3 |
| (2) Mz/Mw | | 18.5 | | 19.9 | | 19.1 | | 3.5 |
| (3) mmmm percentage (%) | | 99.1 | | 99.1 | | 99.1 | | 98.6 |
| (4) D value | | 9.4 | | 9.3 | | 9.4 | | 2.5 |
| MFR (g/10 minutes) | | 27.9 | | 31.9 | | 20.4 | | 24.3 |
| Flexure modulus (MPa) | | 2200 | | 2120 | | 1450 | | 2060 |
| IZ impact strength (J/M) | | 410 | | 330 | | Did not break (>500) | | 210 |
| Surface hardness (R scale) | | 81 | | 79 | | 60 | | 77 |
| Embrittlement temperature (° C.) | | −34 | | −21 | | −43 | | −11 |
| External appearance | | AA | | AA | | AA | | CC |

Examples 17 to 23

The respective polypropylenes obtained in Preparation Examples described above, the rubber components, and the inorganic filler were dry-blended at the quantities shown in Table 7 to prepare polypropylene mixtures. These polypropylene mixtures were pelletized in accordance with the pelletization method of Example 5 and injection molded test pieces of the obtained polypropylene compositions were prepared. The test results are shown in Table 7.

Comparative Example 11

Example 17 was repeated except for using PPc4 obtained in Comparative Preparation Example in place of the polypropylene PP-9, a polypropylene composition was prepared in the same manner as in Example 17. The results are shown in Table 7.

Comparative Example 12

Example 22 was repeated except for using PPc7 obtained in Comparative Preparation Example in place of the polypropylene PP-10, a polypropylene composition was prepared in the same manner as in Example 17. The results are shown in Table 7.

TABLE 7

| Composition | Ex. 17 Type | Ex. 17 Parts by weight | Ex. 18 Type | Ex. 18 Parts by weight | Comp. Ex. 11 Type | Comp. Ex. 11 Parts by weight | Ex. 19 Type | Ex. 19 Parts by weight | Ex. 20 Type | Ex. 20 Parts by weight |
|---|---|---|---|---|---|---|---|---|---|---|
| Polypropylene | PP-9 | 75 | PP-9 | 75 | PPc4 | 75 | PP-9 | 55 | PP-9 | 55 |
| Styrene copolymer (hydrogenated) | S-1 | 25 | S-1 | 5 | S-1 | 25 | S-1 | 25 | S-1 | 5 |
| Etylene/α-olefin copolymer | | | E-2 | 20 | | | | | E-2 | 20 |
| Inorganic filler | | | | | | | A1 | 20 | A1 | 20 |
| Quantity of components soluble in 140° C. decane (wt. %) | | 99.8 | | 99.6 | | 98.7 | | 78.5 | | 79.6 |
| Quantity of components insoluble in 64° C. decane* (wt. %) | | 74.1 | | 74.1 | | 73.6 | | 66.6 | | 66.4 |
| (1) $(\eta)$ (dl/g) | | 1.4 | | 1.4 | | 1.3 | | 1.4 | | 1.4 |
| Mn $(\times 10^{-4})$ | | 3.2 | | 3.1 | | 3.1 | | 3.3 | | 3.2 |
| (2) Mz/Mw | | 16.5 | | 17.5 | | 3.5 | | 16.8 | | 17.9 |
| (3) mmmm percentage (%) | | 99.1 | | 99.1 | | 98.6 | | 98.5 | | 98.5 |
| (4) D value | | 9.3 | | 9.2 | | 2.4 | | 9.1 | | 9.1 |
| Components soluble in 64° C. decane | | — | | — | | 2.8 | | — | | — |
| Propylene content (mole %) | | | | | | | | | | |
| Butene content (mole %) | | 19.7 | | 4.0 | | 17.6 | | 19.5 | | 4.1 |
| Content of comonomers of C8 or more (mole %) | | — | | 6.9 | | — | | — | | 6.6 |
| Styrene content (mole %) | | 4.1 | | 1.2 | | 3.9 | | 3.9 | | 1.2 |
| MFR (g/10 minutes) | | 30.7 | | 28.5 | | 31.1 | | 26.1 | | 25.1 |
| Flexure modulus (MPa) | | 1480 | | 1440 | | 1405 | | 2200 | | 2150 |
| IZ impact strength (J/M) | | 260 | | 290 | | 200 | | 380 | | 350 |
| Surface hardness (R scale) | | 84 | | 81 | | 85 | | 79 | | 76 |
| Embrittlement temperature (° C.) | | −35 | | −31 | | −28 | | −32 | | −26 |
| External appearance | | AA | | AA | | CC | | AA | | AA |

| Composition | Ex. 21 Type | Ex. 21 Parts by weight | Ex. 22 Type | Ex. 22 Parts by weight | Ex. 23 Type | Ex. 23 Parts by weight | Comp. Ex. 12 Type | Comp. Ex. 12 Parts by weight |
|---|---|---|---|---|---|---|---|---|
| Polypropylene | PP-10 | 55 | PP-10 | 55 | PP-10 | 60 | PPc7 | 55 |
| Styrene copolymer (hydrogenated) | S-1 | 12 | | | | | | |
| | S-2 | 13 | | | | | | |
| Etylene/α-olefin copolymer | | | E-2 | 20 | E-1 | 20 | E-2 | 20 |
| | | | E-3 | 5 | E-3 | 10 | E-3 | 5 |
| Inorganic filler | A1 | 20 | A1 | 20 | A1 | 10 | A1 | 20 |
| Quantity of components soluble in 140° C. decane (wt. %) | | 78.6 | | 79.1 | | 89.6 | | 79.9 |
| Quantity of components insoluble in 64° C. decane* (wt. %) | | 66.3 | | 66.1 | | 65.1 | | 65.1 |
| (1) $(\eta)$ (dl/g) | | 1.3 | | 1.3 | | 1.3 | | 1.2 |
| Mn $(\times 10^{-4})$ | | 2.9 | | 3.2 | | 2.9 | | 2.7 |
| (2) Mz/Mw | | 18.5 | | 18.9 | | 19.1 | | 3.6 |
| (3) mmmm percentage (%) | | 99.1 | | 99.1 | | 99.1 | | 98.5 |
| (4) D value | | 9.4 | | 9.3 | | 9.4 | | 2.8 |
| Components soluble in 64° C. decane | | — | | 11.5 | | 18.6 | | 12.9 |
| Propylene content (mole %) | | | | | | | | |

TABLE 7-continued

| | | | | |
|---|---|---|---|---|
| Butene content (mole %) | 18.1 | — | 7.3 | — |
| Content of comonomers of C8 or more (mole %) | — | 8.3 | — | 8.1 |
| Styrene content (mole %) | 5.2 | — | — | — |
| MFR (g/10 minutes) | 27.7 | 31.6 | 20.1 | 30.3 |
| Flexure modulus (MPa) | 2200 | 2120 | 1450 | 2060 |
| IZ impact strength (J/M) | 410 | 330 | Did not break (>500) | 210 |
| Surface hardness (R scale) | 81 | 79 | 60 | 77 |
| Embrittlement temperature (° C.) | −34 | −21 | −44 | −14 |
| External appearance | AA | AA | AA | CC |

Example 24

The polypropylene powders PP-5 and PP-6, obtained in Preparation Examples 5 and 6 examples, and the propylene/ethylene copolymer E-4 were dry-blended at a weight ratio of (PP-5)/(PP-6)/(E-4)=63/37/25 to prepare a polypropylene mixture.

The obtained polypropylene mixture was pelletized in accordance with the pelletization method of Example 5. The results are shown in Table 8.

Comparative Examples 13 and 14

Example 24 was repeated except for using the polypropylene mixtures shown in Table 8 in place of the mixture used there, polypropylene compositions were prepared in the same manner as in Example 24. The results are shown in Table 8.

Referential Example 2

Example 24 was repeated except for using the polypropylene mixture shown in Table 8 in place of the mixture used there, a polypropylene composition was prepared in the same manner as in Example 24. The results are shown in Table 8.

TABLE 8

| Composition | Ex. 24 | Comp. Ex. 13 | Comp. Ex. 14 | Ref. Ex. 2 |
|---|---|---|---|---|
| Polypropylene (parts by weight) | PP-5(13) PP-6(62) | PPc3(12) PPc4(63) | PPc3(59) PPc4(16) | PP-7(10) PP-11(65) |
| Propylene/ethylene copolymer (parts by weight) | E-4(25) | E-4(25) | E-4(25) | E-4(25) |
| Quantity of components soluble in 140° C. decane (wt. %) | 99.2 | 98.8 | 98.5 | 98.9 |
| Quantity of components insoluble in 64° C. decane* (wt. %) | 73.6 | 73.4 | 73.2 | 73.3 |
| (1) (η) (dl/g) | 1.7 | 1.5 | 1.6 | 2.2 |
| Mn (× 10$^{-4}$) | 2.85 | 3.48 | 2.93 | 2.16 |
| Mw (× 10$^{-5}$) | 2.66 | 2.15 | 2.26 | 3.91 |
| Mw (× 10$^{-6}$) | 3.69 | 0.97 | 1.18 | 4.48 |
| (2) Mw/Mn | 9.3 | 6.2 | 7.7 | 18.1 |
| Mz/Mw | 13.9 | 4.5 | 5.2 | 11.5 |
| (3) mmmm percentage (%) | 98.5 | 98.5 | 98.5 | 98.5 |
| (4) D value | 7.1 | 3.5 | 3.7 | 6.1 |
| Components soluble in 64° C. decane Ethylene content (mole %) | 24.8 | 24.8 | 24.7 | 24.8 |
| (η) (dl/g) | 2 | 1.9 | 2.1 | 2 |
| MFR (g/10 minutes) | 13.4 | 15.6 | 14.1 | 18.5 |
| Flexure modulus (MPa) | 1150 | 920 | 960 | 1000 |
| IZ impact strength (23° C.) (J/M) | 240 | 310 | 240 | 180 |
| Tensile elongation (%) | 340 | 360 | 380 | 400 |
| Melt tension (230° C.) (g) | 0.55 | 0.3 | 0.35 | 1.3 |
| SR (230° C.) (γ = 2600) | 1.88 | 1.49 | 1.61 | 2.28 |

Example 25

A polypropylene composition was obtained by pelletizing the polypropylene mixture, that was obtained in Example 24, in accordance with the pelletizing method of Example 1. The results are shown in Table 9.

Comparative Examples 15 and 16

Example 25 was repeated except for using the polypropylene mixtures shown in Table 9 in place of the mixture used there, polypropylene compositions were obtained in the same manner as in Example 25. The results are shown in Table 9.

Referential Example 3

Example 25 was repeated except for using the polypropylene mixture shown in Table 9 in place of the mixture used there, a polypropylene composition was obtained in the same manner as in Example 25. The results are shown in Table 9.

TABLE 9

| Composition | Ex. 25 | Comp. Ex. 15 | Comp. Ex. 16 | Ref. Ex. 3 |
|---|---|---|---|---|
| Polypropylene (parts by weight) | PP-5(13) PP-6(62) | PPc3(12) PPc4(63) | PPc3(59) PPc4(16) | PP-7(10) PP-11(65) |

TABLE 9-continued

| Composition | Ex. 25 | Comp. Ex. 15 | Comp. Ex. 16 | Ref. Ex. 3 |
|---|---|---|---|---|
| Propylene/ethylene copolymer (parts by weight) | E-4(25) | E-4(25) | E-4(25) | E-4(25) |
| Quantity of components soluble in 140° C. decane (wt. %) | 98.5 | 98.9 | 98.6 | 98.5 |
| Quantity of components insoluble in 64° C. decane* (wt. %) | 73.8 | 73.6 | 73.4 | 73.5 |
| (1) ($\eta$) (dl/g) | 1.7 | 1.5 | 1.6 | 2.2 |
| Mn ($\times 10^{-4}$) | 2.88 | 3.45 | 2.92 | 2.12 |
| Mw ($\times 10^{-5}$) | 2.71 | 2.14 | 2.25 | 3.9 |
| Mw ($\times 10^{-6}$) | 3.71 | 0.98 | 1.19 | 4.45 |
| (2) Mw/Mn | 9.4 | 6.2 | 7.7 | 18.4 |
| Mz/Mw | 13.7 | 4.6 | 5.3 | 11.4 |
| (3) mmmm percentage (%) | 98.8 | 98.5 | 98.6 | 98.6 |
| (4) D value | 7.2 | 3.6 | 3.6 | 6.2 |
| Components soluble in 64° C. decane | 24.7 | 24.6 | 24.5 | 24.5 |
| Ethylene content (mole %) | | | | |
| ($\eta$) (dl/g) | 2.1 | 2 | 2 | 1.9 |
| MFR (g/10 minutes) | 13.8 | 15.1 | 14.5 | 18.5 |
| Flexure modulus (MPa) | 1340 | 1180 | 1240 | 1300 |
| IZ impact strength (23° C.) (J/M) | 350 | 430 | 360 | 300 |
| Tensile elongation (%) | 260 | 370 | 310 | 280 |
| Melt tension (230° C.) (g) | 0.56 | 0.29 | 0.36 | 1.29 |
| SR (230° C.) ($\gamma$ = 2600) | 1.89 | 1.49 | 1.6 | 2.27 |

What is claimed is:

1. Crystalline propylene block copolymer comprising components insoluble in 64° C. decane, said components having the following characteristics:
   (1) limiting viscosity ($\eta$) (in 135° C. decalin) of from 0.5 to 10 dl/g;
   (2) molecular weight distribution (Mz/Mw), determined by gel permeation chromatography (GPC; solvent: o-dichlorobenzene, measurement temperature: 140° C.) of at least 5;
   (3) pentad isotacticity (mmmm percentage), which is a stereoregularity index determined by the measurement of the $^{13}$C-NMR spectrum, of at least 98%;
   (4) D value, determined using formula (1) below, from the loss tangents, tan $\delta_{0.05}$ and tan $\eta_{10}$ measured at frequencies, 0.05 rad/sec and 10 rad/sec, respectively, by a melt viscoelasticity measuring device, under a temperature of 230° C. and constant strain, and said loss tangent measurement frequencies, of at least 4.0, $$D = \left| \frac{\log(0.05) - \log(10)}{\log(\tan\delta_{0.05}) - \log(\tan\delta_{10})} \right| \quad (1)$$

and,
   (5) molecular weight distribution (Mw/Mn), determined by gel permeation chromatography (GPC; solvent: o-dichlorobenzene, measurement temperature: 140° C.) of from 6.0 to 20.

2. Crystalline polypropylene as set forth in claim 1, wherein the number-average molecular weight Mn of the components insoluble in 64° C. decane is at least 25,000.

3. Crystalline polypropylene as set forth in claim 1, which comprises at least 60 wt % of said components insoluble in 64° C. decane.

4. Crystalline polypropylene as set forth in claim 1, further comprising prepolymer as a nucleating agent.

5. A process for preparing the crystalline polypropylene of claim 1, which comprises blending 0.5 to 15 wt % of crystalline polypropylene having an intrinsic viscosity ($\eta$) of 8 to 20 dl/g with 99.5 to 85 wt % of crystalline polypropylene having an intrinsic viscosity ($\eta$) of 0.8 to 4.0 dl/g.

6. The process according to claim 5, wherein, the following inequality is satisfied:

$$\{((\eta_1)+(\eta_3))/2\}-1 \leq (\eta_2) \leq \{((\eta_1)+(\eta_3))/2\}+1.$$

7. Polypropylene composition comprising the composition obtained by the process of claim 6.

8. A thermoformed product, which comprises the product obtained by thermoforming crystalline propylene block copolymer of claim 1.

9. Crystalline propylene block copolymer according to claim 1, wherein the molecular weight distribution, Mz/Mw, is from 5.5 to 30.

10. Crystalline propylene block copolymer according to claim 1, wherein the molecular weight distribution, Mw/Mn, is from about 6.5 to about 9.8.

11. Crystalline propylene block copolymer according to claim 1, wherein the D value is at least 4.5.

12. A process for preparing the crystalline propylene block copolymer of claim 1, said process comprising copolymerizing propylene and another monomer in multiple stages and in the presence of a catalyst for preparing highly stereoregular polypropylene.

13. A process for preparing crystalline propylene block copolymer as set forth in claim 12, wherein the multiple-stage polymerization comprises three stages,
   wherein the first stage comprises producing crystalline polypropylene having an intrinsic viscosity ($\eta_1$) of 8 to 20 dl/g, at an amount corresponding to 0.5 to 15 wt % of the finally obtained crystalline polypropylene,
   the second stage comprises producing crystalline polypropylene having an intrinsic viscosity ($\eta_2$) of 3 to 10 dl/g at an amount corresponding to 0.5 to 30 wt % of the finally obtained crystalline polypropylene, and
   the third stage comprises producing crystalline polypropylene having an intrinsic viscosity ($\eta_3$) of 0.8 to 4.0 dl/g, at an amount corresponding to 99 to 55 wt % of the finally obtained crystalline polypropylene, said process further comprising, said process further comprising,
   copolymerizing propylene and ethylene in the presence of said crystalline polypropylenes from said first, second and third stages, to form an ethylene-propylene copolymer rubber.

14. A process for preparing crystalline propylene block copolymer as set forth in claim 12, wherein the multiple-stage polymerization comprises two stages,
   wherein the first stage comprises producing crystalline polypropylene having an intrinsic viscosity ($\eta$) of 8 to 20 dl/g at an amount corresponding to 0.5 to 15 wt % of the finally obtained crystalline polypropylene and
   the second stage comprises producing crystalline polypropylene having an intrinsic viscosity ($\eta$) of 0.8 to 4.0 dl/g at an amount corresponding to 99.5 to 85 wt % of the finally obtained crystalline polypropylene, said process further comprising,
   copolymerizing ethylene and propylene in the presence of the crystalline polypropylenes from said first and second stages, to produce ethylene-propylene rubbery copolymer.

15. Polypropylene composition comprising components soluble in 140° C. decane and, optionally, components insoluble in 140° C. decane, wherein components soluble in 140° C. decane further comprise components insoluble in 64° C. decane, wherein said component insoluble in 64° C. decane comprises crystalline polypropylene block copolymer, and satisfying the following characteristics:

(1) intrinsic viscosity (η) (in 135° C. decalin), of from 0.5 to 10 dl/g;

(2) molecular weight distribution (Mz/Mw), as determined by gel permeation chromatography (GPC; solvent: o-dichlorobenzene, measurement temperature: 140° C.) of at least 5;

(3) pentad isotacticity (mmmm percentage), which is a stereoregularity index determined by the measurement of the $^{13}$C-NMR spectrum, of at least 98%;

(4) D value, determined using formula (1) below, from the loss tangents, tan $\delta_{0.05}$ and tan $\delta_{10}$ measured at the frequencies, 0.05 rad/sec and 10 rad/sec, respectively, by a melt viscoelasticity measuring device, under a temperature of 230° C. and constant strain, and said loss tangent measurement frequencies, of at least 4.0, $$D = \frac{\log(0.05) - \log(10)}{\log(\tan\delta_{0.05}) - \log(\tan\delta_{10})} \quad (1)$$

and, (5) molecular weight distribution (Mw/Mn), determined by gel permeation chromatography (GPC: solvent: o-dichlorobenzene, measurement temperature: 140° C.) of from 6.0 to 20.

16. Polypropylene composition as set forth in claim 15, wherein the number-average molecular weight Mn of the components insoluble in 64° C. decane is at least 25000.

17. Polypropylene composition as set forth in claim 15, which comprises at least 70 wt % of the components soluble in 140° C. decane.

18. Polypropylene composition as set forth in claim 17, wherein the components soluble in 140° C. decane comprise at least 60 wt % of said components insoluble in 64° C. decane.

19. Polypropylene composition as set forth in claim 17, wherein said component soluble in 140° C. decane further comprises ethylene/α-olefin copolymer which is soluble in 64° C. decane.

20. Polypropylene composition as set forth in claim 15, wherein components insoluble in 140° C. decane are present and comprise inorganic filler selected from the group consisting of talc, glass fiber, potassium titanate, and barium sulfate.

21. Polypropylene composition as set forth in claim 15, further comprising nucleating agent.

22. A thermoformed product, which comprises the product obtained by thermoforming the polypropylene composition of claim 15.

23. Propylene polymer composition as set forth in claim 15, wherein the molecular weight distribution, Mz/Mw, of the components insoluble in 64° C. decane is from 5.5 to 30.

24. Propylene polymer composition as set forth in claim 15, wherein the molecular weight distribution, Mw/Mn, of the components insoluble in 64° C. decane is from about 6.5 to about 9.8.

25. Propylene polymer composition as set forth in claim 15, wherein the D value of the components insoluble in 64° C. decane is at least 4.5.

26. Polypropylene composition comprising components soluble in 140° C. decane and, optionally, components insoluble in 140° C. decane, wherein said component soluble in 140° C. decane further comprises components insoluble in 64° C. decane and styrene copolymer which is soluble in 64° C. decane, wherein said components insoluble in 64° C. decane comprise crystalline polypropylene satisfying the following characteristics:

(1) intrinsic viscosity (η) (in 135° C. decalin), of from 0.5 to 10 dl/g;

(2) molecular weight distribution (Mz/Mw), as determined by gel permeation chromatography (GPC; solvent: o-dichlorobenzene, measurement temperature: 140° C.) of at least 5;

(3) pentad isotacticity (mmmm percentage), which is a stereoregularity index determined by the measurement of the $^{13}$C-NMR spectrum, of at least 98%;

(4) D value, determined using formula (1) below, from the loss tangents, tan $\delta_{0.05}$ and tan $\delta_{10}$ measured at the frequencies, 0.05 rad/sec and 10 rad/sec, respectively, by a melt viscoelasticity measuring device, under a temperature of 230° C. and constant strain, and said loss tangent measurement frequencies, of at least 4.0, $$D = \left| \frac{\log(0.05) - \log(10)}{\log(\tan\delta_{0.05}) - \log(\tan\delta_{10})} \right| \quad (1)$$

and, (5) molecular weight distribution (Mw/Mn), determined by gel permeation chromatography (GPC: solvent: o-dichlorobenzene, measurement temperature: 140° C.), of from 6.0 to 20.

* * * * *